(12) United States Patent
Shimura et al.

(10) Patent No.: US 12,455,983 B2
(45) Date of Patent: Oct. 28, 2025

(54) DATA COOPERATION SYSTEM, DATA COOPERATION METHOD, TRUST SYSTEM, AND DATA PUBLICIZING METHOD

(71) Applicant: Hitachi, Ltd., Tokyo (JP)

(72) Inventors: Akitoshi Shimura, Tokyo (JP);
Yoshiyasu Takahashi, Tokyo (JP);
Miki Yonehara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 176 days.

(21) Appl. No.: 18/280,800

(22) PCT Filed: Feb. 14, 2022

(86) PCT No.: PCT/JP2022/005764
§ 371 (c)(1),
(2) Date: Sep. 7, 2023

(87) PCT Pub. No.: WO2022/190777
PCT Pub. Date: Sep. 15, 2022

(65) Prior Publication Data
US 2024/0143837 A1    May 2, 2024

(30) Foreign Application Priority Data
Mar. 11, 2021  (JP) ................................ 2021-038862

(51) Int. Cl.
*G06F 21/62*   (2013.01)
(52) U.S. Cl.
CPC .............................. *G06F 21/6254* (2013.01)

(58) Field of Classification Search
CPC .................................................. G06F 21/6254
See application file for complete search history.

(56) References Cited

U.S. PATENT DOCUMENTS

| 11,769,577 B1 * | 9/2023 | Dods ..................... H04L 9/3228 |
| | | 705/50 |
| 12,113,815 B1 * | 10/2024 | Haslam ............... H04L 63/1425 |

(Continued)

FOREIGN PATENT DOCUMENTS

| JP | 7-21490 A | 1/1995 |
| JP | 2008-59390 A | 3/2008 |

(Continued)

OTHER PUBLICATIONS

Japanese-language Office Action issued in Japanese Application No. 2021-038862 dated Apr. 2, 2024 with English translation (8 pages).

(Continued)

*Primary Examiner* — Stephen T Gundry
(74) *Attorney, Agent, or Firm* — Crowell & Moring LLP

(57) ABSTRACT

In a data cooperation system in which information cooperates in a first system, a second system and a third system, the first system provides an already operating service and collects and publicizes behavior data as information for providing the service, the second system acquires the behavior data, generates a verification result applying the behavior data to a new technology as verification data, and publicizes the verification data, and the third system receives the behavior data and the verification data, supports decision of the determination result data, and publicizes the decided determination result data.

8 Claims, 17 Drawing Sheets

(56) References Cited

U.S. PATENT DOCUMENTS

| | | | |
|---|---|---|---|
| 2014/0351946 A1 | 11/2014 | Oikawa et al. | |
| 2020/0293510 A1 | 9/2020 | Fuchiwaki et al. | |
| 2023/0103078 A1* | 3/2023 | Cella | B25J 9/1653 |
| 2023/0124051 A1* | 4/2023 | Chintakindi | H04W 4/40 |
| | | | 705/14.39 |
| 2023/0143946 A1* | 5/2023 | Konrardy | B60W 30/18163 |
| | | | 701/23 |
| 2023/0179955 A1* | 6/2023 | Williams | A61B 5/4833 |
| | | | 455/456.1 |
| 2023/0182747 A1* | 6/2023 | Kobayashi | B60W 60/0059 |
| | | | 701/1 |
| 2023/0208869 A1* | 6/2023 | Bisht | G06N 7/01 |
| | | | 726/23 |
| 2023/0247038 A1* | 8/2023 | Haga | H04W 4/44 |
| | | | 726/23 |
| 2023/0282036 A1* | 9/2023 | Simoudis | G06N 3/08 |
| 2023/0284029 A1* | 9/2023 | Yang | G08G 1/164 |
| | | | 726/23 |
| 2023/0359336 A1* | 11/2023 | Adenwala | H04W 4/026 |
| 2023/0370491 A1* | 11/2023 | Crabtree | G06N 3/098 |
| 2023/0394495 A1* | 12/2023 | Abdelsamie | G06Q 30/018 |
| 2024/0005376 A1* | 1/2024 | Estes | G06Q 10/06398 |
| 2024/0171614 A1* | 5/2024 | Crabtree | H04L 63/20 |
| 2024/0177546 A1* | 5/2024 | Bennett | G07C 5/0808 |
| 2024/0217523 A1* | 7/2024 | Mehta | G06N 3/08 |
| 2024/0330885 A1* | 10/2024 | Cain, Jr. | G06Q 50/40 |
| 2024/0378992 A1* | 11/2024 | Ran | H04W 12/02 |
| 2025/0016520 A1* | 1/2025 | Williams | H04L 63/107 |
| 2025/0016521 A1* | 1/2025 | Williams | G16H 40/67 |

FOREIGN PATENT DOCUMENTS

| | | |
|---|---|---|
| JP | 2014-229039 A | 12/2014 |
| JP | 2018-195040 A | 12/2018 |
| JP | 2020-13310 A | 1/2020 |
| JP | 2020-149645 A | 9/2020 |
| WO | WO 2019/065409 A1 | 4/2019 |

OTHER PUBLICATIONS

International Search Report (PCT/ISA/210) issued in PCT Application No. PCT/JP2022/005764 dated May 17, 2022 with English translation (4 pages).

Japanese-language Written Opinion (PCT/ISA/237) issued in PCT Application No. PCT/JP2022/005764 dated May 17, 2022 with English translation (8 pages).

* cited by examiner

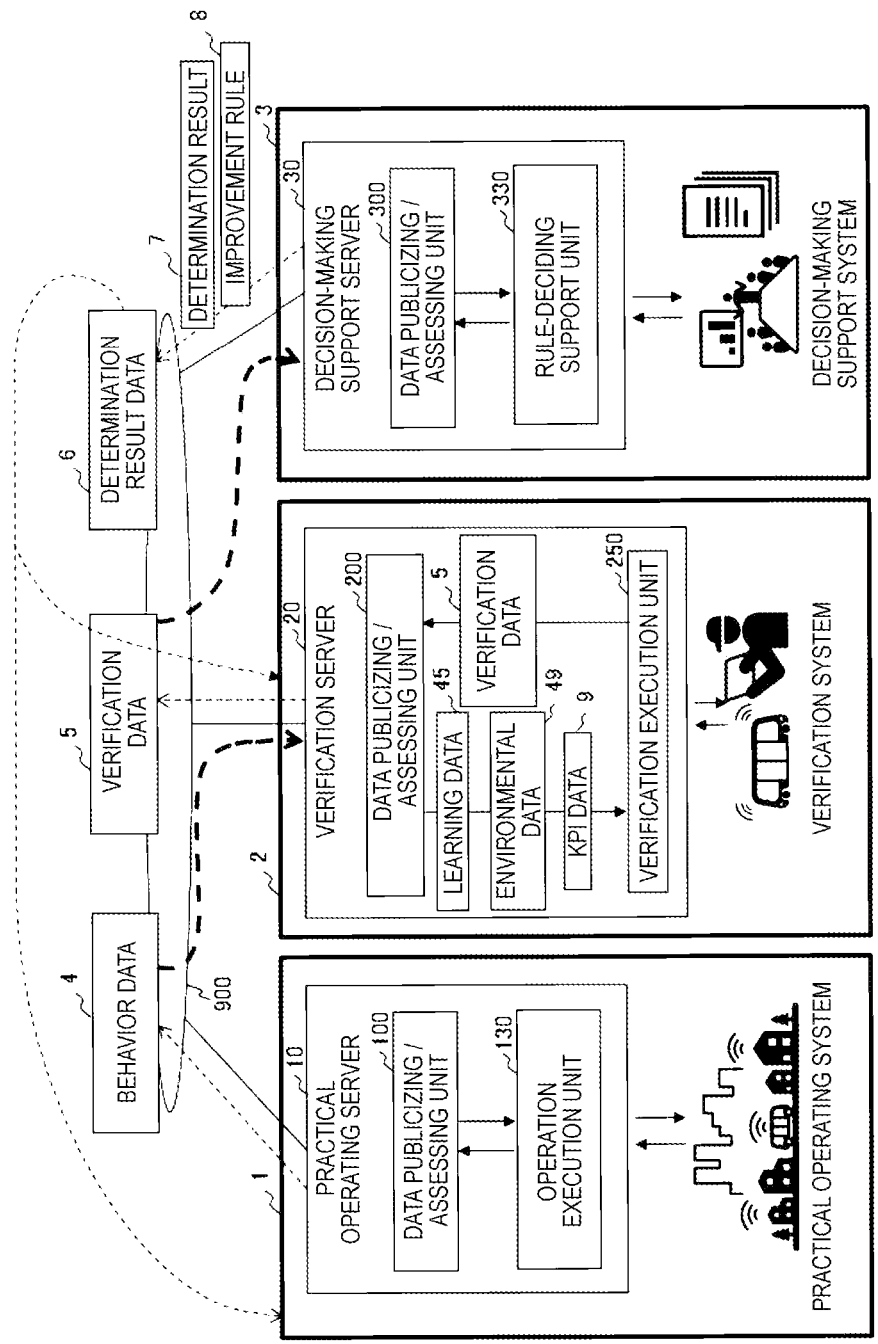
[FIG. 1]

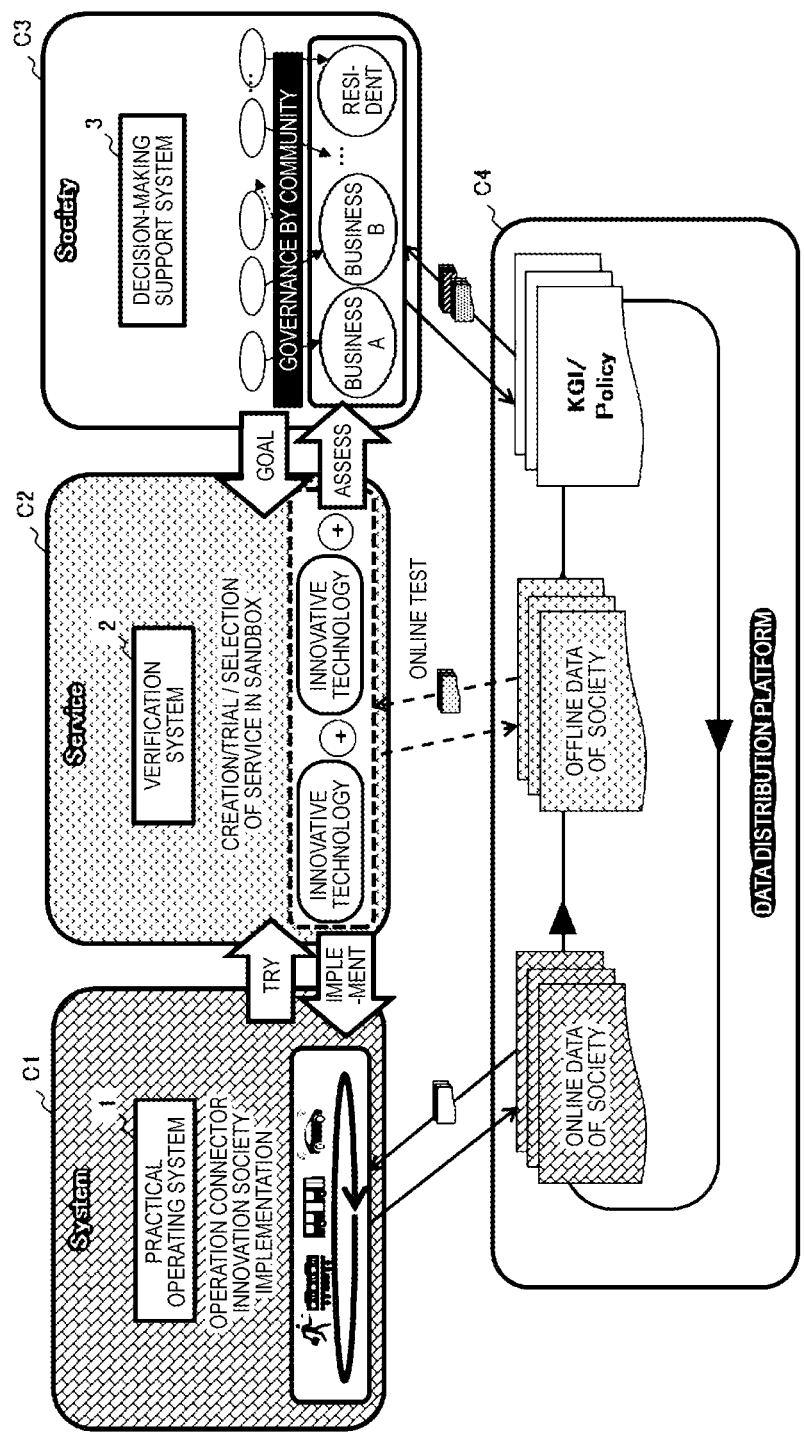
[FIG. 2]

[FIG. 3]
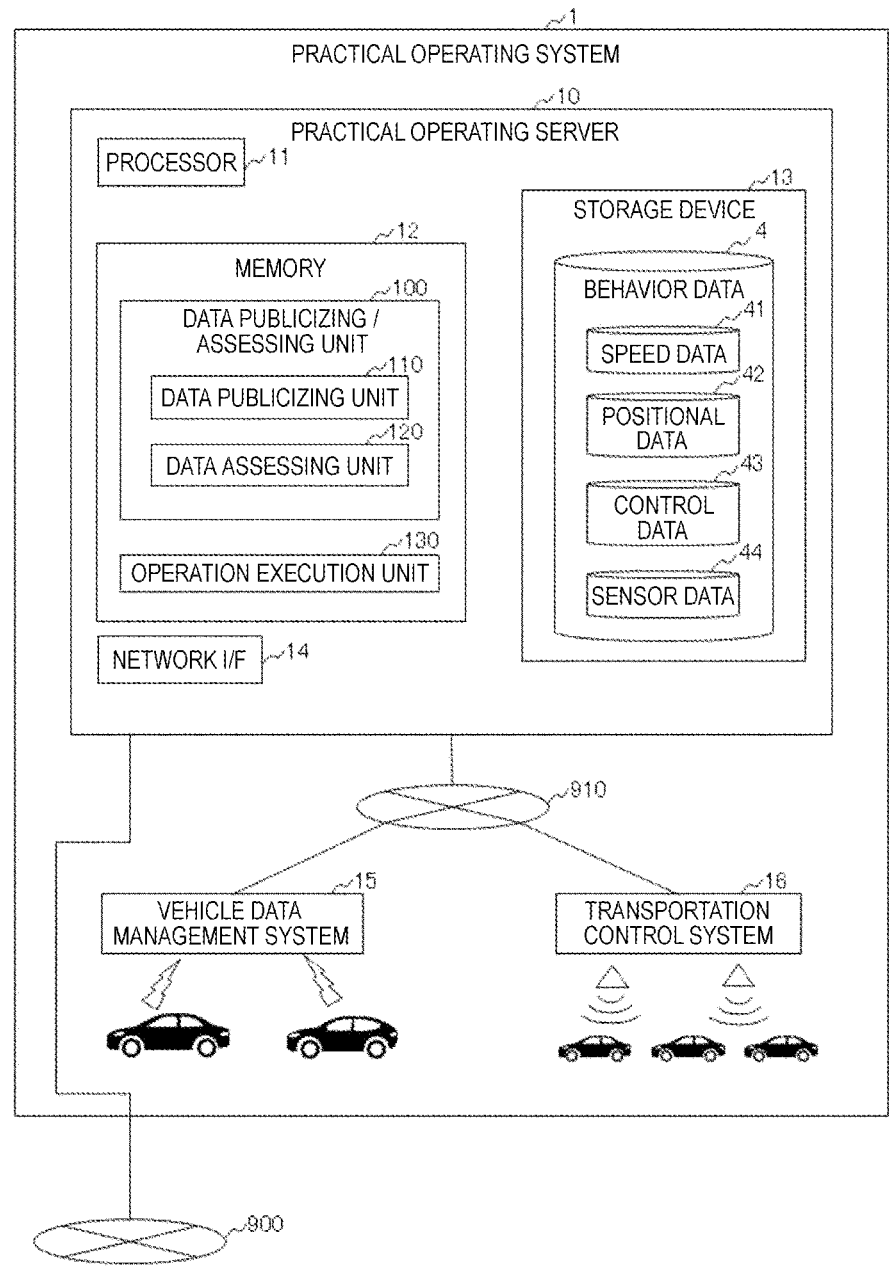

[FIG. 4]
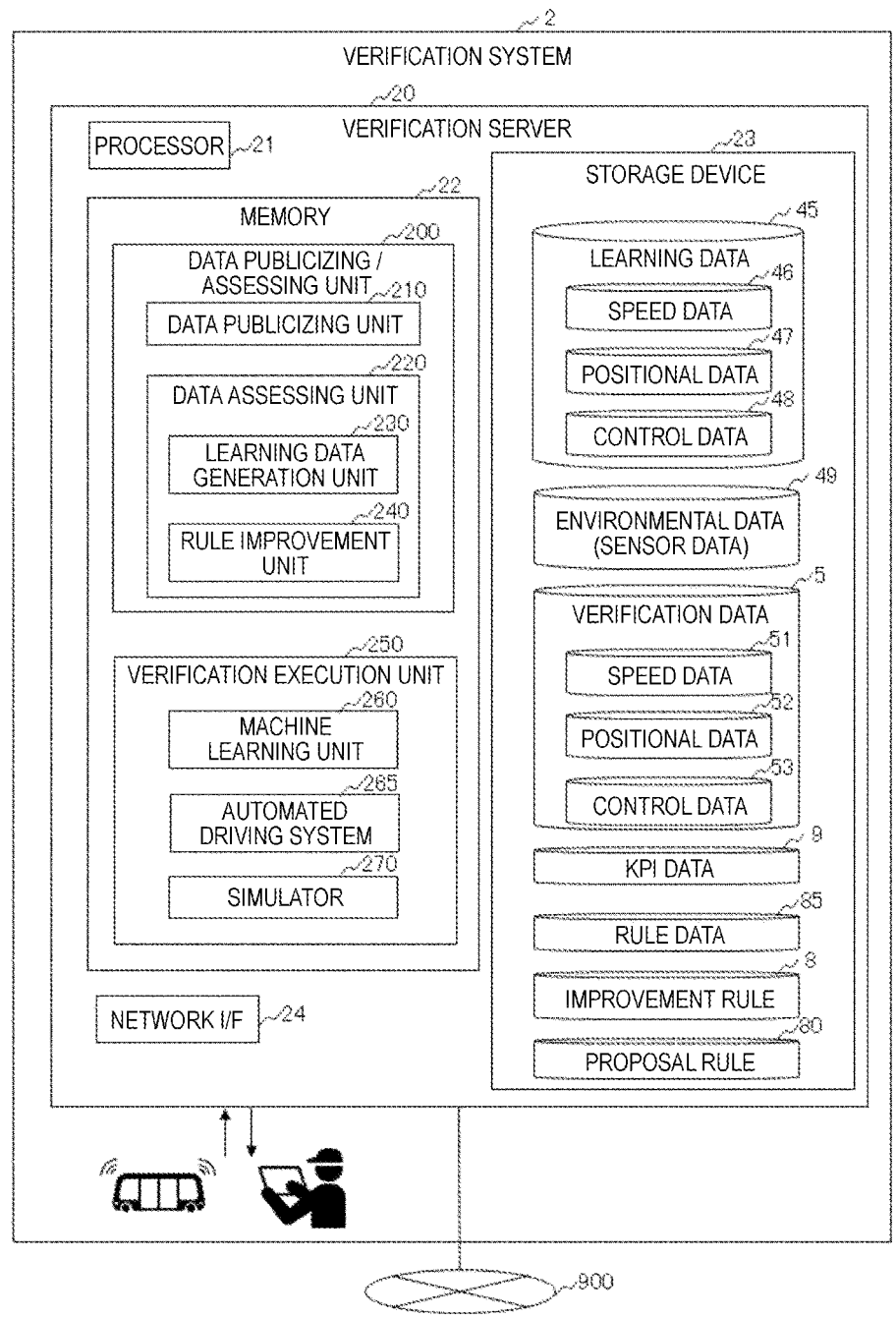

[FIG. 5]
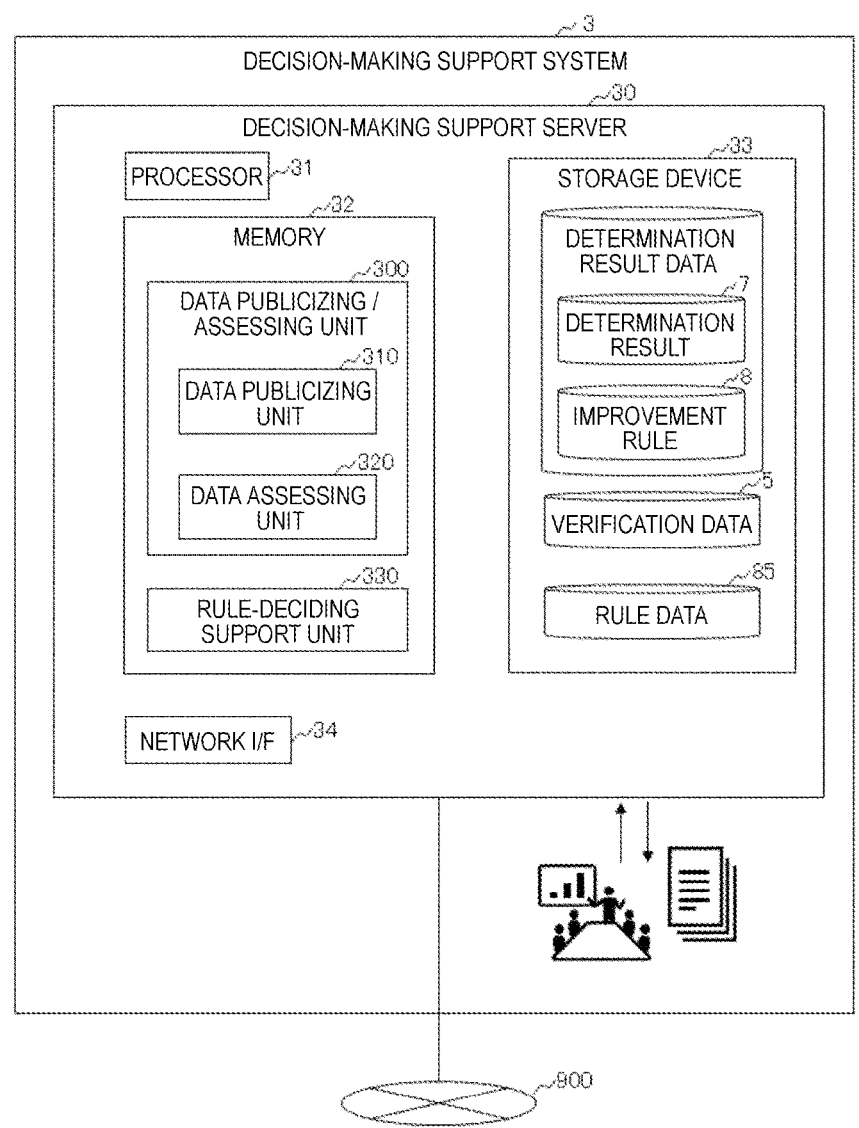

[FIG. 6]
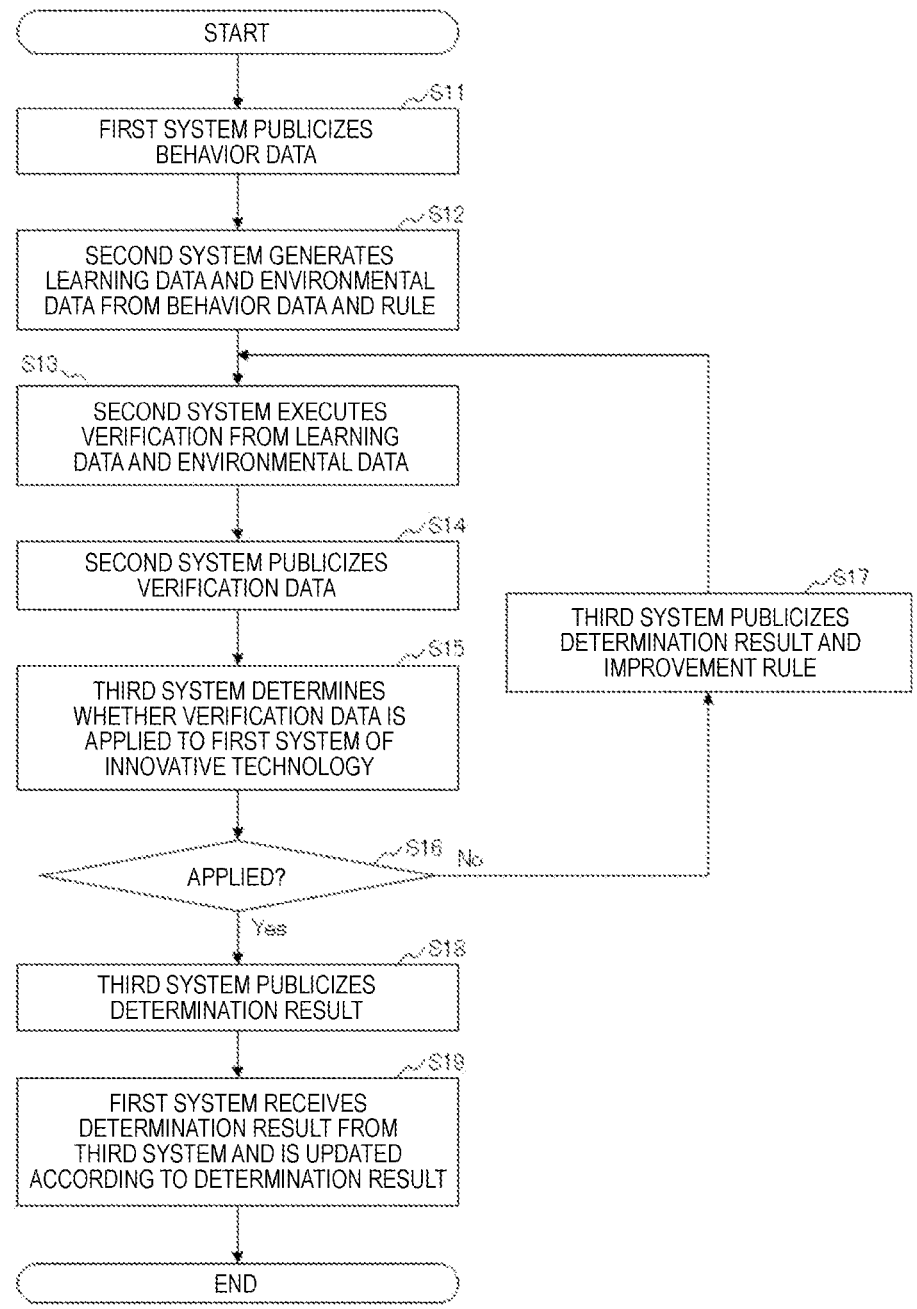

[FIG. 7]
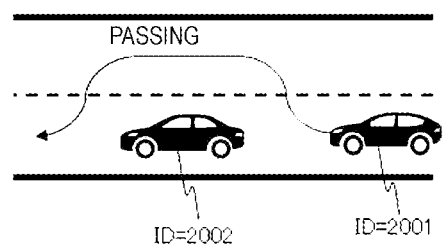
[FIG. 8]
41 SPEED DATA (BEHAVIOR DATA: FIRST LOOP)
| OUTPUTTER ID | BEHAVIOR DATA ID | TIME | DATA TYPE | DATA |
|---|---|---|---|---|
| 2001 | 101 | 12:34:00 | SPEED | 96km/h |
| 2001 | 102 | 12:34:10 | SPEED | 96km/h |
| 2001 | 103 | 12:34:20 | SPEED | 102km/h |
| 2001 | 104 | 12:34:30 | SPEED | 110km/h |
| 2001 | 105 | 12:34:40 | SPEED | 110km/h |
| 2001 | 106 | 12:34:50 | SPEED | 100km/h |
| 2002 | 101 | 12:34:00 | SPEED | 93km/h |
| 2002 | 102 | 12:34:10 | SPEED | 93km/h |
| 2002 | 103 | 12:34:20 | SPEED | 93km/h |
| 2002 | 104 | 12:34:30 | SPEED | 93km/h |
| 2002 | 105 | 12:34:40 | SPEED | 93km/h |
| 2002 | 106 | 12:34:50 | SPEED | 93km/h |
411  412  413  414  415

FIG. 9

42 POSITIONAL DATA (BEHAVIOR DATA: FIRST LOOP)

| OUTPUTTER ID | BEHAVIOR DATA ID | TIME | DATA TYPE | DATA |
|---|---|---|---|---|
| 2001 | 201 | 12:34:00 | POSITION | E135.000, N35.000, LEFT LANE |
| 2001 | 202 | 12:34:10 | POSITION | E135.003, N35.000, LEFT LANE |
| 2001 | 203 | 12:34:20 | POSITION | E135.006, N35.000, RIGHT LANE |
| 2001 | 204 | 12:34:30 | POSITION | E135.012, N35.000, RIGHT LANE |
| 2001 | 205 | 12:34:40 | POSITION | E135.015, N35.000, RIGHT LANE |
| 2001 | 206 | 12:34:50 | POSITION | E135.018, N35.000, LEFT LANE |
| 2002 | 201 | 12:34:00 | POSITION | E135.005, N35.000, LEFT LANE |
| 2002 | 202 | 12:34:10 | POSITION | E135.007, N35.000, LEFT LANE |
| 2002 | 203 | 12:34:20 | POSITION | E135.009, N35.000, LEFT LANE |
| 2002 | 204 | 12:34:30 | POSITION | E135.011, N35.000, LEFT LANE |
| 2002 | 205 | 12:34:40 | POSITION | E135.013, N35.000, LEFT LANE |
| 2002 | 206 | 12:34:50 | POSITION | E135.015, N35.000, LEFT LANE |

43 CONTROL DATA (BEHAVIOR DATA: FIRST LOOP)

| OUTPUTTER ID | BEHAVIOR DATA ID | TIME | DATA TYPE | DATA |
|---|---|---|---|---|
| 2001 | 301 | 12:34:00 | CONTROL | ACCELERATOR 5%, BRAKE 0% |
| 2001 | 302 | 12:34:10 | CONTROL | ACCELERATOR 20%, BRAKE 0%, RIGHT INDICATOR |
| 2001 | 303 | 12:34:20 | CONTROL | ACCELERATOR 30%, BRAKE 0% |
| 2001 | 304 | 12:34:30 | CONTROL | ACCELERATOR 15%, BRAKE 0% |
| 2001 | 305 | 12:34:40 | CONTROL | ACCELERATOR 15%, BRAKE 0%, LEFT INDICATOR |
| 2001 | 306 | 12:34:50 | CONTROL | ACCELERATOR 5%, BRAKE 0% |
| 2002 | 301 | 12:34:00 | CONTROL | ACCELERATOR 5%, BRAKE 0% |
| 2002 | 302 | 12:34:10 | CONTROL | ACCELERATOR 5%, BRAKE 0% |
| 2002 | 303 | 12:34:20 | CONTROL | ACCELERATOR 5%, BRAKE 0% |
| 2002 | 304 | 12:34:30 | CONTROL | ACCELERATOR 5%, BRAKE 0% |
| 2002 | 305 | 12:34:40 | CONTROL | ACCELERATOR 5%, BRAKE 0% |
| 2002 | 306 | 12:34:50 | CONTROL | ACCELERATOR 5%, BRAKE 0% |

44 SENSOR DATA (BEHAVIOR DATA: FIRST LOOP)

| OUTPUTTER ID | BEHAVIOR DATA ID | TIME | DATA TYPE | DATA |
|---|---|---|---|---|
| 2001 | 401 | 12:34:00 | REAR RADAR FOR RIGHT LANE | 123m |
| 2001 | 402 | 12:34:00 | FRONT RADAR FOR RIGHT LANE | 199m |
| 2001 | 403 | 12:34:00 | REAR SITUATION IN TRAVELING LANE | 60m, NO INDICATOR, 99km/h |
| 2001 | 404 | 12:34:00 | FRONT SITUATION IN TRAVELING LANE | 125m, NO INDICATOR, 93km/h |
| 2001 | 405 | 12:34:10 | REAR RADAR FOR RIGHT LANE | 125m |
| 2001 | 406 | 12:34:10 | FRONT RADAR FOR RIGHT LANE | 199m |
| 2001 | 407 | 12:34:10 | REAR SITUATION IN TRAVELING LANE | 70m, NO INDICATOR, 99km/h |
| 2001 | 408 | 12:34:10 | FRONT SITUATION IN TRAVELING LANE | 100m, NO INDICATOR, 93km/h |

85 RULE DATA (LEARNING DATA INPUT: FIRST LOOP)

| COMMUNITY ID | RULE ID | RESTRICTION | CONDITION |
|---|---|---|---|
| C1001 | 401 | SPEED <= 100km/h | |
| C1001 | 402 | SPEED <= 120km/h | POSITION IS IN SPECIFIC SECTION |

46 SPEED DATA (LEARNING DATA INPUT: FIRST LOOP)

| OUTPUTTER ID | BEHAVIOR DATA ID | TIME | DATA TYPE | DATA |
|---|---|---|---|---|
| 2001 | 101 | 12:34:00 | SPEED | 96km/h |
| 2001 | 102 | 12:34:10 | SPEED | 96km/h |
| ~~2001~~ | ~~103~~ | ~~12:34:20~~ | ~~SPEED~~ | ~~102km/h~~ |
| ~~2001~~ | ~~104~~ | ~~12:34:30~~ | ~~SPEED~~ | ~~110km/h~~ |
| ~~2001~~ | ~~105~~ | ~~12:34:40~~ | ~~SPEED~~ | ~~110km/h~~ |
| 2001 | 106 | 12:34:50 | SPEED | 100km/h |
| 2002 | 101 | 12:34:00 | SPEED | 93km/h |
| 2002 | 102 | 12:34:10 | SPEED | 93km/h |
| 2002 | 103 | 12:34:20 | SPEED | 93km/h |
| 2002 | 104 | 12:34:30 | SPEED | 93km/h |
| 2002 | 105 | 12:34:40 | SPEED | 93km/h |
| 2002 | 106 | 12:34:50 | SPEED | 93km/h |

47 POSITIONAL DATA (LEARNING DATA INPUT: FIRST LOOP)

| OUTPUTTER ID | BEHAVIOR DATA ID | TIME | DATA TYPE | DATA |
|---|---|---|---|---|
| 2001 | 201 | 12:34:00 | POSITION | E135.000, N35.000, LEFT LANE |
| 2001 | 202 | 12:34:10 | POSITION | E135.003, N35.000, LEFT LANE |
| ~~2001~~ | ~~203~~ | ~~12:34:20~~ | ~~POSITION~~ | ~~E135.006, N35.000, RIGHT LANE~~ |
| ~~2001~~ | ~~204~~ | ~~12:34:30~~ | ~~POSITION~~ | ~~E135.012, N35.000, RIGHT LANE~~ |
| ~~2001~~ | ~~205~~ | ~~12:34:40~~ | ~~POSITION~~ | ~~E135.015, N35.000, RIGHT LANE~~ |
| 2001 | 206 | 12:34:50 | POSITION | E135.018, N35.000, LEFT LANE |
| 2002 | 201 | 12:34:00 | POSITION | E135.005, N35.000, LEFT LANE |
| 2002 | 202 | 12:34:10 | POSITION | E135.007, N35.000, LEFT LANE |
| 2002 | 203 | 12:34:20 | POSITION | E135.009, N35.000, LEFT LANE |
| 2002 | 204 | 12:34:30 | POSITION | E135.011, N35.000, LEFT LANE |
| 2002 | 205 | 12:34:40 | POSITION | E135.013, N35.000, LEFT LANE |
| 2002 | 206 | 12:34:50 | POSITION | E135.015, N35.000, LEFT LANE |

48 CONTROL DATA (LEARNING DATA INPUT: FIRST LOOP)

| OUTPUTTER ID | BEHAVIOR DATA ID | TIME | DATA TYPE | DATA |
|---|---|---|---|---|
| 1001 | 301 | 12:34:00 | CONTROL | ACCELERATOR 5%, BRAKE 0% |
| 2001 | 302 | 12:34:10 | CONTROL | ACCELERATOR 20%, BRAKE 0%, RIGHT INDICATOR |
| ~~2001~~ | ~~303~~ | ~~12:34:20~~ | ~~CONTROL~~ | ~~ACCELERATOR 20%, BRAKE 0%~~ |
| ~~2001~~ | ~~304~~ | ~~12:34:30~~ | ~~CONTROL~~ | ~~ACCELERATOR 15%, BRAKE 0%~~ |
| ~~2001~~ | ~~305~~ | ~~12:34:40~~ | ~~CONTROL~~ | ~~ACCELERATOR 15%, BRAKE 0%, LEFT INDICATOR~~ |
| 2001 | 306 | 12:34:50 | CONTROL | ACCELERATOR 5%, BRAKE 0% |
| 2002 | 301 | 12:34:00 | CONTROL | ACCELERATOR 5%, BRAKE 0% |
| 2002 | 302 | 12:34:10 | CONTROL | ACCELERATOR 5%, BRAKE 0% |
| 2002 | 303 | 12:34:20 | CONTROL | ACCELERATOR 5%, BRAKE 0% |
| 2002 | 304 | 12:34:30 | CONTROL | ACCELERATOR 5%, BRAKE 0% |
| 2002 | 305 | 12:34:40 | CONTROL | ACCELERATOR 5%, BRAKE 0% |
| 2002 | 306 | 12:34:50 | CONTROL | ACCELERATOR 5%, BRAKE 0% |

401 ENVIRONMENTAL DATA (SENSOR DATA: FIRST LOOP)

| OUTPUTTER ID | BEHAVIOR DATA ID | TIME | DATA TYPE | DATA |
|---|---|---|---|---|
| 2001 | 401 | 12:34:00 | REAR RADAR FOR RIGHT LANE | 123m |
| 2001 | 402 | 12:34:00 | FRONT RADAR FOR RIGHT LANE | 198m |
| 2001 | 403 | 12:34:00 | REAR SITUATION IN TRAVELING LANE | 60m, NO INDICATOR, 99km/h |
| 2001 | 404 | 12:34:00 | FRONT SITUATION IN TRAVELING LANE | 125m, NO INDICATOR, 93km/h |
| 2001 | 405 | 12:34:10 | REAR RADAR FOR RIGHT LANE | 125m |
| 2001 | 406 | 12:34:10 | FRONT RADAR FOR RIGHT LANE | 199m |
| 2001 | 407 | 12:34:10 | REAR SITUATION IN TRAVELING LANE | 70m, NO INDICATOR, 99km/h |
| 2001 | 408 | 12:34:10 | FRONT SITUATION IN TRAVELING LANE | 100m, NO INDICATOR, 93km/h |

80 PROPOSAL RULE (PROPOSAL ID = 1:1 FIRST LOOP)

| PROPOSAL ID | COMMUNITY ID | RULE ID | RESTRICTION | CONDITION |
|---|---|---|---|---|
| 1 | C1001 | 401 | SPEED <= 100km/h | |
| 1 | C1001 | 402 | SPEED <= 120km/h | POSITION IS IN SPECIFIC SECTION |
| 1 | C1002 | 401 | SPEED <= 120km/h | IN PASSING |

46 SPEED DATA (LEARNING DATA INPUT: SECOND LOOP)

| OUTPUTTER ID | BEHAVIOR DATA ID | TIME | DATA TYPE | DATA |
|---|---|---|---|---|
| 2001 | 101 | 12:34:00 | SPEED | 96km/h |
| 2001 | 102 | 12:34:10 | SPEED | 96km/h |
| 2001 | 103 | 12:34:20 | SPEED | 102km/h |
| 2001 | 104 | 12:34:30 | SPEED | 110km/h |
| 2001 | 105 | 12:34:40 | SPEED | 110km/h |
| 2001 | 106 | 12:34:50 | SPEED | 100km/h |
| 2002 | 101 | 12:34:00 | SPEED | 93km/h |
| 2002 | 102 | 12:34:10 | SPEED | 93km/h |
| 2002 | 103 | 12:34:20 | SPEED | 93km/h |
| 2002 | 104 | 12:34:30 | SPEED | 93km/h |
| 2002 | 105 | 12:34:40 | SPEED | 93km/h |
| 2002 | 106 | 12:34:50 | SPEED | 93km/h |

47 POSITIONAL DATA (LEARNING DATA INPUT: SECOND LOOP)

| OUTPUTTER ID | BEHAVIOR DATA ID | TIME | DATA TYPE | DATA |
|---|---|---|---|---|
| 2001 | 201 | 12:34:00 | POSITION | E135.000, N35.000, LEFT LANE |
| 2001 | 202 | 12:34:10 | POSITION | E135.003, N35.000, LEFT LANE |
| 2001 | 203 | 12:34:20 | POSITION | E135.006, N35.000, RIGHT LANE |
| 2001 | 204 | 12:34:30 | POSITION | E135.012, N35.000, RIGHT LANE |
| 2001 | 205 | 12:34:40 | POSITION | E135.015, N35.000, RIGHT LANE |
| 2001 | 206 | 12:34:50 | POSITION | E135.018, N35.000, LEFT LANE |
| 2002 | 201 | 12:34:00 | POSITION | E135.005, N35.000, LEFT LANE |
| 2002 | 202 | 12:34:10 | POSITION | E135.007, N35.000, LEFT LANE |
| 2002 | 203 | 12:34:20 | POSITION | E135.009, N35.000, LEFT LANE |
| 2002 | 204 | 12:34:30 | POSITION | E135.011, N35.000, LEFT LANE |
| 2002 | 205 | 12:34:40 | POSITION | E135.013, N35.000, LEFT LANE |
| 2002 | 206 | 12:34:50 | POSITION | E135.015, N35.000, LEFT LANE |

48 CONTROL DATA (LEARNING DATA INPUT: SECOND LOOP)

| OUTPUTTER ID | BEHAVIOR DATA ID | TIME | DATA TYPE | DATA |
|---|---|---|---|---|
| 2001 | 301 | 12:34:00 | CONTROL | ACCELERATOR 5%, BRAKE 0% |
| 2001 | 302 | 12:34:10 | CONTROL | ACCELERATOR 20%, BRAKE 0%, RIGHT INDICATOR |
| 2001 | 303 | 12:34:20 | CONTROL | ACCELERATOR 20%, BRAKE 0% |
| 2001 | 304 | 12:34:30 | CONTROL | ACCELERATOR 15%, BRAKE 0% |
| 2001 | 305 | 12:34:40 | CONTROL | ACCELERATOR 15%, BRAKE 0%, LEFT INDICATOR |
| 2001 | 306 | 12:34:50 | CONTROL | ACCELERATOR 5%, BRAKE 0% |
| 2002 | 301 | 12:34:00 | CONTROL | ACCELERATOR 5%, BRAKE 0% |
| 2002 | 302 | 12:34:10 | CONTROL | ACCELERATOR 5%, BRAKE 0% |
| 2002 | 303 | 12:34:20 | CONTROL | ACCELERATOR 5%, BRAKE 0% |
| 2002 | 304 | 12:34:30 | CONTROL | ACCELERATOR 5%, BRAKE 0% |
| 2002 | 305 | 12:34:40 | CONTROL | ACCELERATOR 5%, BRAKE 0% |
| 2002 | 306 | 12:34:50 | CONTROL | ACCELERATOR 5%, BRAKE 0% |

8 IMPROVEMENT RULE (SECOND LOOP)

| COMMUNITY ID | RULE ID | RESTRICTION | CONDITION |
|---|---|---|---|
| C1001 | 401 | SPEED <= 100km/h | |
| C1001 | 402 | SPEED <= 120km/h | POSITION IS IN SPECIFIC SECTION |
| C1002 | 401 | SPEED <= 120km/h | IN PASSING |

51 SPEED DATA: SIMULATION RESULT (VERIFICATION DATA: SECOND LOOP)

| OUTPUTTER ID | VERIFICATION DATA ID | TIME | DATA TYPE | DATA |
|---|---|---|---|---|
| V2001 | 101 | 12:34:00 | SPEED | 96km/h |
| V2001 | 102 | 12:34:10 | SPEED | 96km/h |
| V2001 | 103 | 12:34:20 | SPEED | 102km/h |
| V2001 | 104 | 12:34:30 | SPEED | 110km/h |
| V2001 | 105 | 12:34:40 | SPEED | 110km/h |
| V2001 | 106 | 12:34:50 | SPEED | 100km/h |
| 2002 | 101 | 12:34:00 | SPEED | 93km/h |
| 2002 | 102 | 12:34:10 | SPEED | 93km/h |
| 2002 | 103 | 12:34:20 | SPEED | 93km/h |
| 2002 | 104 | 12:34:30 | SPEED | 93km/h |
| 2002 | 105 | 12:34:40 | SPEED | 93km/h |
| 2002 | 106 | 12:34:50 | SPEED | 93km/h |

52 POSITIONAL DATA: SIMULATION RESULT (VERIFICATION DATA: SECOND LOOP)

| OUTPUTTER ID | VERIFICATION DATA ID | TIME | DATA TYPE | DATA |
|---|---|---|---|---|
| V2001 | 201 | 12:34:00 | POSITION | E135.000, N35.000, LEFT LANE |
| V2001 | 202 | 12:34:10 | POSITION | E135.003, N35.000, LEFT LANE |
| V2001 | 203 | 12:34:20 | POSITION | E135.006, N35.000, RIGHT LANE |
| V2001 | 204 | 12:34:30 | POSITION | E135.012, N35.000, RIGHT LANE |
| V2001 | 205 | 12:34:40 | POSITION | E135.015, N35.000, RIGHT LANE |
| V2001 | 206 | 12:34:50 | POSITION | E135.018, N35.000, LEFT LANE |
| 2002 | 201 | 12:34:00 | POSITION | E135.005, N35.000, LEFT LANE |
| 2002 | 202 | 12:34:10 | POSITION | E135.007, N35.000, LEFT LANE |
| 2002 | 203 | 12:34:20 | POSITION | E135.009, N35.000, LEFT LANE |
| 2002 | 204 | 12:34:30 | POSITION | E135.011, N35.000, LEFT LANE |
| 2002 | 205 | 12:34:40 | POSITION | E135.013, N35.000, LEFT LANE |
| 2002 | 206 | 12:34:50 | POSITION | E135.015, N35.000, LEFT LANE |

53 CONTROL DATA: SIMULATION RESULT (VERIFICATION DATA: SECOND LOOP)

| OUTPUTTER ID | VERIFICATION DATA ID | TIME | DATA TYPE | DATA |
|---|---|---|---|---|
| V2001 | 301 | 12:34:00 | POSITION | ACCELERATOR 5%, BRAKE 0% |
| V2001 | 302 | 12:34:10 | POSITION | ACCELERATOR 20%, BRAKE 0%, RIGHT INDICATOR |
| V2001 | 303 | 12:34:20 | POSITION | ACCELERATOR 20%, BRAKE 0% |
| V2001 | 304 | 12:34:30 | POSITION | ACCELERATOR 15%, BRAKE 0% |
| V2001 | 305 | 12:34:40 | POSITION | ACCELERATOR 15%, BRAKE 0%, LEFT INDICATOR |
| V2001 | 306 | 12:34:50 | POSITION | ACCELERATOR 5%, BRAKE 0% |
| 2002 | 301 | 12:34:00 | POSITION | ACCELERATOR 5%, BRAKE 0% |
| 2002 | 302 | 12:34:10 | POSITION | ACCELERATOR 5%, BRAKE 0% |
| 2002 | 303 | 12:34:20 | POSITION | ACCELERATOR 5%, BRAKE 0% |
| 2002 | 304 | 12:34:30 | POSITION | ACCELERATOR 5%, BRAKE 0% |
| 2002 | 305 | 12:34:40 | POSITION | ACCELERATOR 5%, BRAKE 0% |
| 2002 | 306 | 12:34:50 | POSITION | ACCELERATOR 5%, BRAKE 0% |

9 KPI DATA: SIMULATION RESULT (VERIFICATION DATA: SECOND LOOP)

| KPI | TARGET VALUE | CURRENT SITUATION RULE | VERIFICATION VALUE |
|---|---|---|---|
| CO2 EMISSION | 1,200g | 1,400g | 1,100g |
| ACCIDENT POSSIBILITY | 0.0001% | 0.00005% | 0.00007% |

7 DETERMINATION RESULT (SECOND LOOP)

| PROPOSAL ID | COMMUNITY ID | APPLICATION POSSIBILITY | CONDITION |
|---|---|---|---|
| 1 | C1002 | APPLICABLE | LIMITED TO SECTIONS A AND B |

71  72  73  74

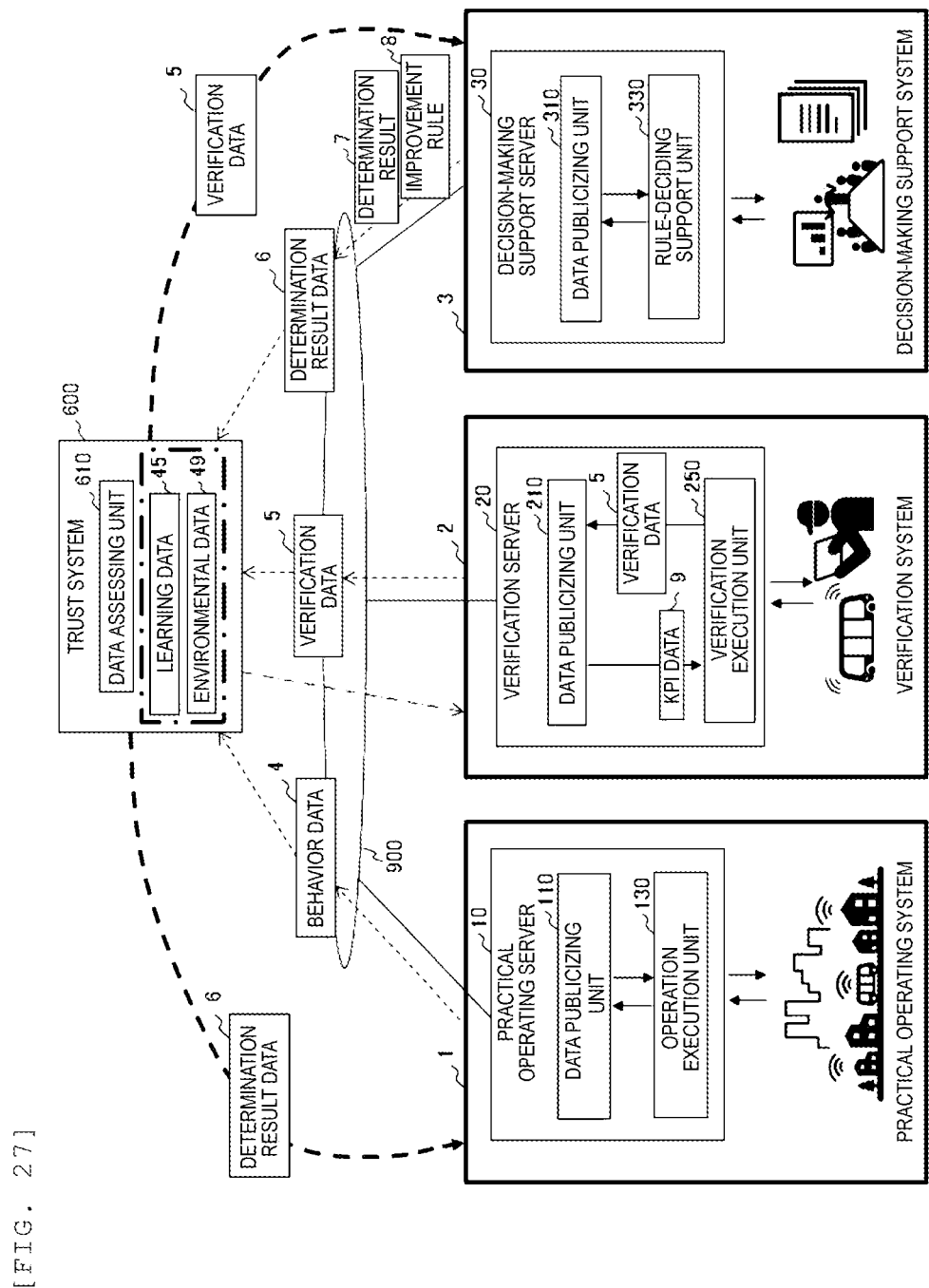

DATA COOPERATION SYSTEM, DATA COOPERATION METHOD, TRUST SYSTEM, AND DATA PUBLICIZING METHOD

CROSS-REFERENCE TO RELATED APPLICATION

This application is based upon and claims the benefit of priority from Japanese Patent Application No. 2021-38862, filed Mar. 11, 2021, the entire content of which is incorporated herein by reference.

TECHNICAL FIELD

The present invention relates to a data cooperation system using data transmitted to and received from each system by a plurality of different systems.

BACKGROUND ART

New services have recently been created with expansion and acceleration of networks or significant advances in use of cyber spaces. With improvement in performance of semiconductors or secondary batteries or advance in artificial intelligence (AI), new systems such as automated driving systems of vehicles or drone systems of small flight vehicles have been created.

To put new services or systems to practical use in actual societies, it is necessary to execute procedures of assessing verification data for verifying the new services or systems by government, industry organizations, or the like, improving laws, rules, or the like, and incorporating the new systems (or services) in actual societies.

To implement the procedures, it is necessary to cooperate information between different systems and determine laws or the like based on the verification data. As a technology for cooperating information between organizations, for example, PTL 1 is known.

PTL 1 discloses a technology for determining reliability of information provided from a plurality of organizations and providing indexes for using the information to users.

CITATION LIST

Patent Literature

PTL 1: JP2020-149645A

SUMMARY OF INVENTION

Technical Problem

In the technology of the related art, reliability of data is uniquely calculated regardless of a purpose of a use side and the use side cannot calculate the reliability according to the purpose. Contribution to reliability by attribute of an organization using the data, data value, or the like differs depending on a community.

For example, it is important to ensure reliability of data between systems and then cooperate the data when a decision-making support system is used in which a verification system executing verification to create a new system or service generates verification data from data of a practical operating system operated in an actual society, the verification data is assessed by government or industry organization, and it is determined whether to apply the assessed verification data to an actual society.

To apply a new system, service, or the like by utilizing innovative technology created by the verification system to the actual society, it is necessary to update legislation or rules quickly in administration where the decision-making support system is used.

In the example of the related art or the like, however, a framework for the innovative technology created in the verification system to be applied to a practical operating system cannot be constructed and legislation or the like cannot catch up with a speed of technology innovation currently. For example, in an automated driving system of a vehicle or an autonomous flight system of a small flight vehicle (drone), there is a problem that a responsible subject, a condition or a region to be applied, or the like is not determined quickly.

Accordingly, the present invention has been made in view of the foregoing problems and an object of the present invention is to create a new system or service for utilizing innovative technology in a verification system using data of an already operating practical operating system, assess verification data provided by the verification system in a decision-making support system, and quickly feed the created new system or service back to the practical operating system.

Solution to Problem

According to an aspect of the present invention, provided is a data cooperation system in which a first system, a second system, and a third system are connected to a network to execute cooperation of information. The first system includes a first computer providing an already operating service, and collects and publicizes behavior data as information for providing the service. The second system acquires the behavior data, includes a second computer executing verification of a case where the behavior data is applied to a new fourth system, generates a verification result as verification data, and publicizes the verification data. The third system receives the behavior data publicized by the first system and the verification data publicized by the second system, includes a third computer supporting decision of determination result data, receives the decided determination result data, and publicizes the determination result data. The fourth system is applied to the first system based on the determination result data publicized by the third system.

Advantageous Effects of Invention

Accordingly, in the present invention, a new system or service (fourth system) utilizing innovative technology is created using data of the first system operating practically (practical operating system) by the second system (verification system), verification data output by the second system is assessed by the third system (decision-making support system), and the created new system or service (fourth system) can be quickly fed back to the first system.

Details of at least one embodiment of a subject disclosed in the present specification are specified in the appended drawings and the following description. Other features, aspects, and effects of the disclosed subject are apparent from the following disclosure, drawings, and claims.

BRIEF DESCRIPTION OF DRAWINGS

FIG. 1 is a diagram illustrating an example of a data cooperation system according to Example 1 of the present invention.

FIG. 2 is a diagram illustrating an example of the data cooperation system and a data distribution platform according to Example 1 of the present invention.

FIG. 3 is a block diagram illustrating an example of a practical operating system according to Example 1 of the present invention.

FIG. 4 is a block diagram illustrating an example of a verification system according to Example 1 of the present invention.

FIG. 5 is a block diagram illustrating an example of a decision-making support system according to Example 1 of the present invention.

FIG. 6 is a flowchart illustrating an example of a process executed in the data cooperation system according to Example 1 of the present invention.

FIG. 7 is a diagram illustrating an example of a traveling state of a vehicle according to Example 1 of the present invention.

FIG. 8 is a diagram illustrating an example of speed data included in behavior data of a practical operating server according to Example 1 of the present invention.

FIG. 9 is a diagram illustrating an example of positional data included in the behavior data of the practical operating server according to Example 1 of the present invention.

FIG. 10 is a diagram illustrating an example of control data included in the behavior data of the practical operating server according to Example 1 of the present invention.

FIG. 11 is a diagram illustrating an example of sensor data included in the behavior data of the practical operating server according to Example 1 of the present invention.

FIG. 12 is a diagram illustrating an example of rule data according to Example 1 of the present invention.

FIG. 13 is a diagram illustrating an example of speed data included in learning data of a verification server according to Example 1 of the present invention.

FIG. 14 is a diagram illustrating an example of positional data included in the learning data of the verification server according to Example 1 of the present invention.

FIG. 15 is a diagram illustrating an example of control data included in the learning data of the verification server according to Example 1 of the present invention.

FIG. 16 is a diagram illustrating an example of environmental data of the verification server according to Example 1 of the present invention.

FIG. 17 is a diagram illustrating an example of a proposal rule output by the verification server according to Example 1 of the present invention.

FIG. 18 is a diagram illustrating an example of speed data (second loop) included in the learning data of the verification server according to Example 1 of the present invention.

FIG. 19 is a diagram illustrating an example of positional data (second loop) included in the learning data of the verification server according to Example 1 of the present invention.

FIG. 20 is a diagram illustrating an example of control data (second loop) included in the learning data of the verification server according to Example 1 of the present invention.

FIG. 21 is a diagram illustrating an example of an improvement rule (second loop) according to Example 1 of the present invention.

FIG. 22 is a diagram illustrating an example of speed data included in verification data of the verification server according to Example 1 of the present invention.

FIG. 23 is a diagram illustrating an example of positional data included in the verification data of the verification server according to Example 1 of the present invention.

FIG. 24 is a diagram illustrating an example of control data included in the verification data of the verification server according to Example 1 of the present invention.

FIG. 25 is a diagram illustrating an example of KPI data of the verification server according to Example 1 of the present invention.

FIG. 26 is a diagram illustrating an example of a determination result of the decision-making support server according to Example 1 of the present invention.

FIG. 27 is a diagram illustrating an example of a data cooperation system according to Example 2 of the present invention.

DESCRIPTION OF EMBODIMENTS

Hereinafter, embodiments of the present invention will be described with reference to the appended drawings.

Example 1

FIG. 1 is a diagram illustrating an example of a data cooperation system according to Example 1 of the present invention. The data cooperation system is configured as a distributed system including: a practical operating system (first system) 1 that publicizes behavior data 4 of an existing system that is already providing a service; a verification system (second system) 2 that publicizes verification data 5 of a new system or service (a fourth system, for example, an automated driving system) in which innovative technology which has not yet been implemented and is required to be implemented in future is used; and a decision-making support system (third system) 3 that publicizes determination result data 6 regarding whether a new system or service (fourth system) may be applied to the practical operating system 1 from the verification data 5 publicized by the verification system 2 and the behavior data 4 publicized by the practical operating system 1.

When a determination result 7 of the determination result data 6 of the decision-making support system 3 permits a new system or service using innovative technology to be operated (or be embedded) in the practical operating system 1, an improvement rule 8 included in the determination result data 6 is applied to the practical operating system 1.

However, when the determination result 7 of the determination result data 6 of the decision-making support system 3 negates implementation of the new system or service, the verification system 2 executes the verification again by the improvement rule 8 included in the determination result data 6 and publicizes the verification data 5.

The practical operating system 1 is, for example, a system included in a control center or the like providing a traffic information service and collects traveling data collected from, for example, connected-cars and publicizes the collected data as the behavior data 4. The traveling data includes navigation data (positional information, a traveling route, a traveling time, or the like) and control data (acceleration or brake, an in-vehicle sensor data (environmental data)).

The verification system 2 is, for example, a system included in an organization that promotes verification of automated driving (levels 3 to 5) which does not depend on drivers, verifies an automated driving system to which innovative technology is applied using the behavior data 4 publicized by the practical operating system 1, and publicizes a verification result as the verification data 5.

The decision-making support system 3 is, for example, a system used to make agreement between organizations such as administration or business organizations which consider implementation of the automated driving system as a new system or service (fourth system) using innovative technology.

The decision-making support system 3 determines whether the behavior data 4 publicized from the practical operating system (first system) 1 is properly used for the verification data 5 by using the verification data 5 publicized from the verification system 2 and the behavior data 4 publicized from the practical operating system 1, and publicizes the determination result as the determination result data 6. The determination result data 6 includes the determination result 7 indicating whether the innovative technology is to be applied (embedded) to the practical operating system 1 and the improvement rule 8 formed by laws or rules necessary to implement the new system or service to which the innovative technology is applied.

The determination result data 6 is fed back to the verification system 2 or the practical operating system 1. When the determination result 7 of the determination result data 6 is negation indicating non-implementation in the practical operating system 1, the verification system 2 executes the verification again based on the improvement rule 8 and publicizes the verification data 5 again.

When the determination result 7 of the determination result data 6 is permission of an operation of the new system or service using the innovative technology, the practical operating system 1 updates an in-vehicle system or updates rules of the control center based on the improvement rule 8.

Here, verification in which the behavior data 4 is used in the verification system 2 is executed, for example, as follows.

In the verification system 2, learning data is generated from traveling data (navigation data and control data) included in the behavior data 4 and a model (for example, a machine learning model) of an automated driving system is trained.

Then, the verification system 2 generates environmental data that is a traveling environment of a learning target vehicle from the behavior data 4 and verifies a behavior of a model of the automated driving system using the navigation data, the control data, and the environmental data.

The verification data 5 publicized by the verification system 2 includes a verification result, traveling data (navigation data and control data) of the automated driving system, and environmental data used for reproduction. The verification system 2 can propose the improvement rule 8 based on the verification data 5.

The determination result data 6 is data publicized to the verification system 2 and the practical operating system 1 when the decision-making support system 3 receives the determination result 7 and the improvement rule 8 determined in a committee or a congress based on the verification data 5 and the behavior data 4.

As an example of the determination result 7 and the improvement rule 8, the determination result 7 includes content "Automated driving system is implemented" and the improvement rule 8 includes data such as "Interchange B to C of highway A at level 4 of automated driving is permitted".

The determination result data 6 (the determination result 7 and the improvement rule 8) indicating permission of an operation of the new system or service using the innovative technology is publicized by the decision-making support system 3 and is applied to the practical operating system 1 or the verification system 2. In application to the practical operating system 1, for example, when the improvement rule 8 is "Interchange B to C of highway A at level 4 of automated driving is permitted", the practical operating system 1 delivers information indicating "Automated driving of level 4 is permitted in interchange B to C of highway A" to navigation data or a map in a vehicle data management system for each vehicle.

The vehicle that has the automated driving system receiving an update of navigation data from the vehicle data management system executes automated driving at automated driving level 4 or higher in interchange B to C of highway A.

Accordingly, in the verification system 2, a result obtained by verifying the new system or service using the innovation technology from the behavior data 4 publicized by the practical operating system 1 is publicized as the verification data 5, and the innovative technology can be quickly applied to the practical operating system 1 based on the determination result data 6 publicized by the decision-making support system 3 based on the verification data 5 and the behavior data 4.

In the data cooperation system, data can be sometimes verified by sequentially cooperating the verification data 5 and the determination result data 6 and, a case where a situation is changed can also be predicted by applying virtual output data in addition to actual data to a model.

Since the foregoing data cooperation is implemented between each system, each system is configured as follows. Computers of the practical operating system 1, the verification system 2, and the decision-making support system 3 are respectively connected to a network 900.

First, the practical operating system 1 includes a practical operating server 10 that collects traveling data form vehicles and collects a monitoring result of a road state from a traffic control system, causes the practical operating server 10 to provide a traffic information service, and publicizes the behavior data 4 including the traveling data.

The practical operating server 10 includes a data publicizing/assessing unit 100 and an operation execution unit 130. The operation execution unit 130 collects the traveling data or the road state and provides the traffic information service. The data publicizing/assessing unit 100 is a functional unit in which an assessing unit that generates the behavior data 4 and a publicizing unit that publicizes the behavior data 4 to the verification system 2 and the decision-making support system 3 are combined.

The data publicizing/assessing unit 100 can preset data to be publicized and data to be filtered or anonymized in the traveling data according to a reliability of a publicization destination of the behavior data 4. The reliability is a value preset according to the publicization destination. The data publicizing/assessing unit 100 decreases intensity of filtering or the like as the value of the reliability is larger, and increases the intensity of the filtering or the like as the value of the reliability is smaller.

The verification system 2 includes a verification server 20 that executes verification by a machine learning model or the like from the behavior data 4 and outputs the verification data 5. Here, machine learning will be described as an example, but a learning algorithm is not limited to the machine learning. The verification server 20 includes a data publicizing/assessing unit 200 that collects the behavior data 4 from the practical operating system 1 and generates learning data 45 or environmental data 49 of the machine learning model and a verification execution unit 250 that inputs the environmental data 49 to the trained machine learning model and outputs the verification data 5.

The data publicizing/assessing unit 200 is a functional unit in which a data publicizing unit that collects the behavior data 4 and publicizes the verification data 5 and an assessing unit that generates the learning data 45 and the environmental data 49 from the behavior data 4 and assesses the verification data 5 to be output are combined.

The data publicizing/assessing unit 200 can select data to be input to the machine learning model from the behavior data 4 according to legal systems or rules. For example, the learning data 45 can be generated excluding data in which a speed exceeds a speed limit in the traveling data of the behavior data 4.

The data publicizing/assessing unit 200 can select data to be input to the machine learning model from the behavior data 4 based on the improvement rule 8 of the determination result data 6 publicized by the decision-making support system 3 in addition to legal systems or rules.

The data publicizing/assessing unit 200 can preset data to be publicized and data to be filtered or anonymized according to a reliability of a publication destination of the verification data 5. The reliability is a value preset according to the publicization destination. The data publicizing/assessing unit 200 decreases intensity of filtering or the like as the value of the reliability is larger, and increases the intensity of the filtering or the like as the value of the reliability is smaller.

The verification execution unit 250 inputs key performance indicator (KPI) data 9 for assessing a verification result in addition to the learning data 45 and the environmental data 49. The KPI data 9 is, for example, data including a preset target value or threshold such as $CO_2$ emission or an accident rate.

The verification execution unit 250 can propose a proposal rule 80 to the decision-making support system 3 based on the verification data 5 and the KPI data 9. The proposal rule 80 may be input by a user of the verification server 20 or may be received by the verification execution unit 250.

The decision-making support system 3 includes a decision-making support server 30 that receives the verification data 5 and the behavior data 4 as input and outputs the determination result data 6 including the determination result 7 and the improvement rule 8.

The decision-making support server 30 includes a data publicizing/assessing unit 300 that collects the verification data 5 from the verification system 2, collects the behavior data 4 from the practical operating system 1, and publicizes the determination result data 6 including the determination result 7 and the improvement rule 8 determined based on the verification data 5 and the behavior data 4, and a rule-deciding support unit 330 that proposes the verification data 5 and the behavior data 4 and receives the determination result data 6.

The data publicizing/assessing unit 300 can preset data to be publicized and data to be filtered or anonymized according to a reliability or the like of a publicization destination of the determination result data 6. The reliability is a value preset according to the publicization destination. The data publicizing/assessing unit 300 decreases intensity of filtering or the like as the value of the reliability is larger, and increases the intensity of the filtering or the like as the value of the reliability is smaller.

The rule-deciding support unit 330 can propose the improvement rule 8 proposed from the verification system 2 in addition to the verification data 5 and the behavior data 4 and can support determination in a committee or a congress related to implementation of the new system or service to which innovative technology is applied.

As described above, in the data cooperation system, the behavior data 4 generated in the actual practical operating system 1 is changed to the verification data 5 indicating an operational effect of a case where the new system or service using the innovative technology is applied to the verification system 2. The decision-making support system 3 receiving the verification data 5 and the behavior data 4 outputs whether to implement the new system or service and the determination result data 6 for applying the innovative technology to the actual practical operating system 1.

In the actually operating practical operating system 1, the innovative technology can be applied (embedded) to the actual practical operating system 1 and provide the new service by applying the improvement rule 8 of the determination result data 6.

Thereby, in the data cooperation system, smooth circulation can be realized such that the behavior data 4 of the practical operating system 1 is changed to the verification data 5 of the innovative technology, the determination result data 6 is further generated from the verification data 5 and the behavior data 4, and the determination result data 6 is fed back to the practical operating system 1.

In the assessing units of the data publicizing/assessing units 100, 200, and 300 of each system, a trust system controlling access according to reliability according to a publicization destination of data is applied.

The trust system is a data distribution platform that controls access to provided data based on a use purpose of a data user that creates values satisfying data owners and levels of data protection. In the trust system, reliability of the data users is calculated from policies of the data owners and policies of the data users and access control is executed according to the reliability.

In the data cooperation system according to the example, by applying the trust system to the assessing units of the data publicizing/assessing units 100, 200, and 300 of each system to ensure a reliability relation between a data provider (publicizer) and a data user and then executing data cooperation, it is possible to implement safe and smooth data cooperation.

<Data Distribution Platform>

FIG. 2 is a diagram illustrating an example of the data cooperation system and the data distribution platform. The illustrated example is an example in which a community operated by the practical operating system 1 is System (C1), a community operated by the verification system 2 is Service (C2), a community operated by the decision-making support system 3 is Society (C3), and a system executing data cooperation between each community is a data distribution platform (C4).

The data distribution platform C4 is equivalent to the trust system in which the assessing units of the data publicizing/assessing units 100, 200, and 300 of each system illustrated in FIG. 1 are connected to each other. It is important for governance to be connected systematically to both development and social implementation of the innovative technology on the data distribution platform (C4) and to function effectively in society.

In system construction of the related art in which an operation is executed based on rules decided by laws, it is difficult to meet various needs continuously in society where changes are normalized. An architecture referred to as an S3 architecture is an architecture that ascertains a society from three views of Society (C3), Service (C2), and System (C1), that is, a goal is flexibly set while agreement is formed between stakeholders related to a service (Society (C3)), trustworthiness of a new service is quickly ensured (Service (C2)), and an operation can be changed resiliently (System (C1)).

In the S3 architecture, a future proof society is gradually realized by sharing a social goal or data based on reliable data via the data distribution platform C4 and repeating trial and assessment in Society (C3), Service (C2), and System (C1).

Specifically, a goal (key goal indicator (KGI)) determined by making agreement between stakeholders related to a service in Society (C3) is shared with innovators verifying innovative technologies in Service (C2) or operators already operating services in an actual society in System (C1).

From System (C1), operation data related to the service being used in the actual society, that is, online data of the society, is shared with the stakeholders of Society (C3) or the innovators of Service (C2). The online data of the society is used in Society (C3) or Service (C2) as assessment data for setting a new goal and as environmental data for simulating the real world.

From Service (C2), data related to innovative technology during verification, that is, offline data of the society related to the new system or service which may be operated in future using innovative technology, is shared with the stakeholders of Society (C3) as a determination material regarding a goal achievement situation or whether to apply and operate the data in an actual system.

Sharing of the three views of Society (C3), Service (C2), and System (C1) is performed while the reliability thereof is protected by the data distribution platform C4.

In the three views of Society (C3), Service (C2), and System (C1), systems that process data from the data distribution platform C4 and are in charge of interfaces between the stakeholders, the innovators, and the operators are the decision-making support system 3, the verification system 2, and the practical operating system 1, respectively.

The decision-making support system 3 supports a process in which stakeholders such as a plurality of businesses or regional residents related to the new service discuss governance of a community and reach agreement. The community is formed by users who approve application of innovative technology verified by the verification system 2 to the practical operating system 1. The innovative technology mentioned here is, for example, a generic term of new technologies that are not implemented in society but are required to realize a more enriched life by social implementation such as an automated driving vehicle. Specifically, the innovative technology is realized in combination with an existing technology of the related art or a new technology which will appear in future.

As a technology verified by the verification system 2, there is a case where the verification is started by innovators, and a case where the verification is started based on a goal set by the community in Society (C3).

The practical operating system 1 is, for example, a system such as a traffic control system that is used to operate a social service supporting life of people. Data related to a service used in an actual society is collected by the practical operating system 1 and is shared as online data of the society with the verification system 2 or the decision-making support system 3 via the data distribution platform C4.

When stakeholders approve the new system or service utilizing innovative technology verified by the verification system 2 via the decision-making support system 3, the new system or service can be immediately applied to the real world.

Even in a society where changes are normalized and needs are various, the new system or service necessary for the society can be provided timely by utilizing the innovative technology from the three views of the S3 architecture and the data distribution platform C4. Thus, it is possible to construct trust of a social system systematically.

Hereinafter, the practical operating system, the verification system, and the decision-making support system will be described specifically.

<Practical Operating System>

FIG. 3 is a block diagram illustrating an example of the practical operating system 1. The practical operating system 1 includes a vehicle data management system 15 that collects data of vehicles and delivers the navigation data or the like, a traffic control system 16 that monitors the road state and provides the traffic information service, and the practical operating server 10 that controls the vehicle data management system 15 and the traffic control system 16 via a network 910.

The vehicle data management system 15 collects traveling data from vehicles such as connected-cars and delivers navigation data (map data) or software (updater). The traffic control system 16 provides the traffic information service delivering situations of roads from sensors installed in the roads or traveling data of vehicles.

The practical operating server 10 is a computer that includes a processor 11, a memory 12, a storage device 13, and a network interface 14. The data publicizing/assessing unit 100 and the operation execution unit 130 are loaded as programs in the memory 12. The data publicizing/assessing unit 100 includes a data publicizing unit 110 and a data assessing unit 120.

Each functional unit of the data publicizing unit 110, the data assessing unit 120, and the operation execution unit 130 is loaded as a program in the memory 12 and is executed by the processor 11.

The processor 11 works as a functional unit that provides a predetermined function by executing a process according to the program of each functional unit. For example, the processor 11 functions as the data publicizing unit 110 by executing a process according to a data publicizing program. The same applies to other programs. The processor 11 also works as a functional unit that provides a function of each of a plurality of processes executed by each program. A computer and a computer system are a device and a system including the functional units.

The operation execution unit 130 controls the vehicle data management system 15 and the traffic control system 16 and outputs traveling data collected by the vehicle data management system 15 to the data publicizing/assessing unit 100. The operation execution unit 130 transmits an updated version of navigation data or software to the vehicle data management system 15 based on the improvement rule 8 of the determination result data 6 received from the decision-making support system 3 by the data publicizing/assessing unit 100, or transmits an updated version related to regulations to the traffic control system 16 and applies the automated driving system to the actual practical operating system 1.

When the collected traveling data is publicized, the data assessing unit 120 of the data publicizing/assessing unit 100 applies the above-described trust system, selects data to be publicized as it is and data to be filtered or anonymized according to a reliability of a user of a publicization destination, and then generates the behavior data 4 for publicization.

The data publicizing unit 110 of the data publicizing/assessing unit 100 executes communication with the network 900 and publicizes the behavior data 4 generated by the data assessing unit 120 to the verification system 2 or the decision-making support system 3. The data publicizing unit 110 receives the determination result data 6 from the decision-making support system 3 via the network 900.

The storage device 13 stores the behavior data 4 generated by the data assessing unit 120 based on the traveling data collected from the vehicle data management system 15. In the example, an example in which traveling data is accumulated in the vehicle data management system 15 will be described.

The behavior data 4 includes speed data 41, positional data 42, control data 43, and sensor data 44. Details of each piece of data will be described below.

The network interface 14 is connected to the network 900 to communicate with the verification server 20 or the decision-making support server 30. The network interface 14 is connected to the network 900 to communicate with the vehicle data management system 15 or the traffic control system 16.

FIG. 8 is a diagram illustrating an example of the speed data 41 included in the behavior data 4. The speed data 41 is an example of data when a vehicle with ID=2001 passes a vehicle with ID=2002, as illustrated in FIG. 7.

The speed data 41 includes an outputter ID 411, a behavior data ID 412, a time 413, a data type 414, and data 415 in one record. In the outputter ID 411, an identifier of a vehicle transmitting the speed data 41 is stored.

The behavior data ID 412 is a time-series identifier of the behavior data 4. For example, data at time 413=12:34:00 in the speed data 41 of each outputter ID 411 can be identified by data with behavior data ID 412=101.

The data type 414 indicates a type of behavior data 4 and is "speed" in the case of the speed data 41. In the data 415, a speed per hour of a vehicle is stored.

FIG. 9 is a diagram illustrating an example of the positional data 42 included in the behavior data 4. The positional data 42 is data in a traveling state illustrated in FIG. 7.

The positional data 42 includes an outputter ID 421, a behavior data ID 422, a time 423, a data type 424, and data 425 in one record. In the outputter ID 421, an identifier of a vehicle transmitting the positional data 42 is stored.

The behavior data ID 422 is a time-series identifier of the behavior data 4. For example, data at time 423=12:34:00 in the data of each outputter ID 421 can be identified by data with behavior data ID 422=201. The data type 424 indicates a type of behavior data 4 and is "position" in the case of the positional data 42. The data 425 stores latitude, longitude, and a lane of a vehicle.

FIG. 10 is a diagram illustrating an example of the control data 43 included in the behavior data 4. The control data 43 is data in a traveling state illustrated in FIG. 7.

The control data 43 includes an outputter ID 431, a behavior data ID 432, a time 433, a data type 434, and data 435 in one record. In the outputter ID 431, an identifier of a vehicle transmitting the control data 43 is stored.

The behavior data ID 432 is a time-series identifier of the behavior data 4. For example, data at time 433=12:34:00 in data of each outputter ID 431 can be identified by data with behavior data ID 432=301. The data type 434 indicates a type of behavior data 4 and is "control" in the case of the control data 43. In the data 435, an accelerator operation amount, a brake operation amount, a direction indicator operation, and a direction indicator steering amount (not illustrated) are stored.

FIG. 11 is a diagram illustrating an example of the sensor data 44 included in the behavior data 4. The sensor data 44 is data in a traveling state illustrated in FIG. 7.

The sensor data 44 includes an outputter ID 441, a behavior data ID 442, a time 443, a data type 444, and data 445 in one record. In the outputter ID 441, an identifier of a vehicle transmitting the sensor data 44 is stored.

The behavior data ID 442 is a time-series identifier of the behavior data 4. For example, data at time 443=12:34:00 in the data of each outputter ID 441 can be identified by data with behavior data ID 442=49. The data type 444 indicates a type of sensor of the vehicle. In the data 445, data detected by the sensor of the data type 444 is stored.

In the illustrated example, the data of an in-vehicle sensor of the vehicle with the outputter ID 441=2001 which is learning target data is shown, but the sensor data 44 can be generated for each outputter ID 441 of a learning target.

<Verification System>

FIG. 4 is a block diagram illustrating an example of the verification system 2. The verification system 2 collects the behavior data 4 publicized by the practical operating system 1, generates the learning data 45 of the machine learning model from the behavior data 4 and rule data 85 (or the improvement rule 8), and verifies the machine learning model. The verification system 2 publicizes the verification result as the verification data 5. The verification system 2 can publicize the proposal rule 80 or the KPI data 9 regarding the improvement rule 8 based on the verification data 5 in addition to the verification data 5.

In the verification system 2, the verification server 20 is configured as a subject. The verification server 20 is a computer that includes a processor 21, a memory 22, a storage device 23, and a network interface 24. The data publicizing/assessing unit 200 and the verification execution unit 250 are loaded as programs in the memory 22.

The data publicizing/assessing unit 200 includes a data publicizing unit 210 and a data assessing unit 220. The data assessing unit 220 includes a learning data generation unit 230 and a rule improvement unit 240. The verification execution unit 250 includes a machine learning unit 260, an automatic driving system (fourth system) 265, and a simulator 270. The verification execution unit 250 may be mounted on a verification target vehicle independently of the verification server 20 and the verification server 20 may acquire the verification data 5 via the network interface 24.

Each functional unit of the data publicizing unit 210, the learning data generation unit 230, the rule improvement unit 240, the machine learning unit 260, and the simulator 270 is loaded as a program in the memory 22 and is executed by the processor 21.

The processor 21 works as a functional unit that provides a predetermined function by executing a process according to the program of each functional unit. For example, the processor 21 functions as the data publicizing unit 210 by executing a process according to a data publicizing program. The same applies to other programs. The processor 21 works as a functional unit that provides a function of each of a plurality of processes executed by each program. A computer and a computer system are a device and a system including the functional units.

The data publicizing unit 210 of the data publicizing/assessing unit 200 communicates with the network 900 and publicizes the verification data 5 output from the data assessing unit 220 to the decision-making support system 3. The data publicizing unit 210 can add the proposal rule 80 to the verification data 5 when the proposal rule 80 is output from the data assessing unit 220.

The data publicizing unit 110 collects the behavior data 4 from the practical operating system 1 and receives the determination result data from the decision-making support system 3 via the network 900.

In the data assessing unit 220 of the data publicizing/assessing unit 200, the learning data generation unit 230 generates the learning data 45 of the machine learning model from the behavior data 4 and the rule data 85 (or the improvement rule 8) collected from the practical operating system 1. The learning data generation unit 230 generates the environmental data 49 input to the trained machine learning model from the sensor data 44 of the behavior data 4.

The environmental data 49 is data from which data of an in-vehicle sensor of a vehicle with an outputter ID of a learning target is extracted.

The rule improvement unit 240 of the data publicizing/assessing unit 200 can receive the proposal rule 80 of the improvement rule 8 based on the verification data 5 and adds the proposal rule 80 to the verification data 5. The proposal rule 80 can be input by a user of the verification system 2.

When the generated verification data 5, the proposal rule 80, or the KPI data 9 is publicized, the data assessing unit 220 applies the above-described trust system, selects data to be publicized as it is and data to be filtered or anonymized according to a reliability of a user of a publicization destination, and generates the verification data 5 for publicization.

The verification execution unit 250 generates the machine learning model of the automated driving system 265 by training the machine learning model using the learning data 45. The simulator 270 inputs the environmental data 49 to the automated driving system 265 configured with the trained machine learning model and generates the verification data 5 and the KPI data 9.

The storage device 23 stores the learning data 45 and the environmental data 49 generated by the data assessing unit 220, and the verification data 5 and the KPI data 9 generated by the verification execution unit 250. The storage device 23 stores the preset rule data 85 and improvement rule 8.

The learning data 45 includes speed data 46, positional data 47, and control data 48. The verification data 5 includes speed data 51, positional data 52, and control data 53. In the rule data 85, restrictions or disciplines such as laws or rules applied to the current practical operating system 1 are preset. In the improvement rule 8, the determination result data 6 acquired from the decision-making support system 3 and the proposal rule 80 output by the rule improvement unit 240 are stored. Details of each piece of data will be described below.

The network interface 24 is connected to the network 900 to communicate with the practical operating server 10 or the decision-making support server 30.

Next, an example of a process executed by the verification server 20 will be described. When the data publicizing/assessing unit 200 acquires the behavior data 4 from the practical operating server 10, the learning data generation unit 230 of the verification server 20 generates the learning data 45 and the environmental data 49.

In a first process (first loop), the learning data generation unit 230 may select data within a range of the rule data 85 and generate the learning data 45 and the environmental data 49. For example, in the rule data 85, when a speed limit of a highway except for a specific section is 100 Km/h, the speed data 46 exceeding the speed limit may be excluded from a learning target.

Subsequently, in the verification execution unit 250, the machine learning unit 260 trains the machine learning model of the automated driving system 265 using the learning data 45 and the rule data 85 (or the improvement rule 8). The simulator 270 inputs the environmental data 49 to the trained machine learning model, executes simulation (verification) of the automated driving system, and generates a verification result as the verification data 5. The simulator 270 receives the KPI data 9 and calculates the KPI data 9 corresponding to the verification data 5.

The verification execution unit 250 outputs the generated verification data 5 and KPI data 9 to the data assessing unit 220. In the data assessing unit 220, the rule improvement unit 240 proposes the verification data 5 and the KPI data 9 to a user or the like of the verification server 20 and receives the proposal rule 80.

The data assessing unit 220 applies the above-described trust system to the verification data 5, the KPI data 9, and the proposal rule 80 and then publicizes each piece of data to the decision-making support system 3 via the data publicizing unit 210.

When the decision-making support system 3 publicizes the determination result data 6 regarding the publicized verification data 5 (the KPI data 9 or the proposal rule 80), the verification server 20 acquires the determination result data 6. When the determination result 7 indicates that innovative technology is not applied and includes the improvement rule 8, the verification server 20 can generate the learning data 45 according to the improvement rule 8 and repeat the verification according to a new machine learning model.

FIG. 12 is a diagram illustrating an example of the rule data 85. As the rule data 85, the same data is used in the practical operating system 1, the verification system 2, and the decision-making support system 3. The rule data 85 includes a community ID 851, a rule ID 822, a restriction 853, and a condition 854 in one record.

In the community ID 851, an identifier of a region or an organization to which the rule is applied is stored. In the rule ID 852, identification preset in the rule is stored. In the restriction 853, contents regulated by the rule is stored. In the condition 854, a condition for applying the restriction 853 is stored.

The illustrated example is an example in which a speed limit of a vehicle is set to 120 Km/h when a position is in a specific section, and the speed limit is set to 100 Km/h when a position is in other sections.

FIG. 13 is a diagram illustrating an example of the speed data 46 included in the learning data 45 in the first time (first loop). The speed data 46 is similar to the speed data 41 of the behavior data 4.

The speed data 46 includes an outputter ID 461, a behavior data ID 462, a time 463, a data type 464, and data 465 in one record.

As illustrated in the drawing, a strikethrough is added to data of time 463=12:34:20 to time 12:34:40 of an outputter ID 461=2001, meaning that the data is excluded from the learning data 45. This is because the position of the outputter ID 461=2001 is not in the specific section and the speed exceeded the speed limit 100 Km/h of the rule ID 312.

FIG. 14 is a diagram illustrating an example of the positional data 47 included in the learning data 45 in the first time (first loop). The positional data 47 is similar to the positional data 42 of the behavior data 4. The positional data 47 includes an outputter ID 471, a behavior data ID 472, a time 473, a data type 474, and data 475 in one record.

As illustrated in the drawing, a strikethrough is added to data of time 473=12:34:20 to time 12:34:40 of an outputter ID 471=2001, meaning that the data is excluded from the learning data 45. This indicates that positional data in a period in which a speed exceeds the above-described speed limit is excluded from the learning data 45.

FIG. 15 is a diagram illustrating an example of the control data 48 included in the learning data 45 in the first time (first loop). The control data 48 is similar to the control data 43 of the behavior data 4. The control data 48 includes an outputter ID 481, a behavior data ID 482, a time 483, a data type 484, and data 485 in one record.

As illustrated in the drawing, a strikethrough is added to data of time 483=12:34:20 to time 12:34:40 of an outputter ID 481=2001, meaning that the data is excluded from the learning data 45. This indicates that control data in a period in which a speed exceeds the above-described speed limit is excluded from the learning data 45.

FIG. 16 is a diagram illustrating an example of the environmental data 49 in the first time (first loop). The environmental data 49 is similar to the sensor data 44 of the behavior data 4. The environmental data 49 includes an outputter ID 491, a behavior data ID 492, a time 493, a data type 494, and data 495 in one record.

FIG. 17 is a diagram illustrating an example of the proposal rule 80 in the first time (first loop). The improvement rule 8 includes a proposal ID 801, a community ID 802, a rule ID 803, a restriction 804, and a condition 805 in one record.

In the proposal ID 801, an identifier of the proposal rule 80 proposed to the decision-making support system 3 by the verification server 20 is stored.

In the community ID 802, an identifier of a region or an organization to which the proposal rule 80 is applied is stored. In the rule ID 803, an identifier preset in the rule is stored. In the restriction 804, contents regulated by the rule is stored. In the condition 805, a condition for applying the restriction 804 is stored.

The illustrated drawing is an example in which a proposal rule for alleviating the speed limit of a vehicle to 120 Km/h is added when the condition 805 is passing (overtaking) with the rule ID 803=401.

<Decision-Making Support System>

FIG. 5 is a block diagram illustrating an example of the decision-making support system 3. The decision-making support system 3 collects the behavior data 4 publicized by the practical operating system 1 and the verification data 5 (including the KPI data 9 or the proposal data) publicized by the verification system 2, determines whether to apply the automated driving system to the practical operating system 1, and publicizes whether to apply the automated driving system, a condition at the time of application, and the like as the determination result data 6.

In the decision-making support system 3, the decision-making support server 30 is configured as a subject. The decision-making support server 30 is a computer that includes a processor 31, a memory 32, a storage device 33, and a network interface 34. The data publicizing/assessing unit 300 and the rule-deciding support unit 330 are loaded as programs in the memory 32.

The data publicizing/assessing unit 300 includes a data publicizing unit 310 and a data assessing unit 320.

The processor 31 works as a functional unit that provides a predetermined function by executing a process according to the program of each functional unit. For example, the processor 31 functions as the data publicizing unit 310 by executing a process according to a data publicizing program. The same applies to other programs. The processor 31 works as a functional unit that provides a function of each of a plurality of processes executed by each program. A computer and a computer system are a device and a system including the functional units.

The storage device 33 stores the determination result data 6 including the determination result 7 and the improvement rule 8, the verification data 5, and the rule data 85. The rule data 85 is the same as the data used in the verification server 20. The verification data 5 is data collected from the verification server 20. The improvement rule 8 will be described below.

The network interface 34 is connected to the network 900 to communicate with the verification server 20 or the decision-making support server 30.

Next, a process of each functional unit will be described. When the determination result data 6 is publicized, the data assessing unit 320 of the data publicizing/assessing unit 300 applies the above-described trust system, selects data to be publicized as it is and data to be filtered or anonymized according to a reliability of a user of a publicization destination, and then generates the determination result data 6 for publicization.

The data assessing unit 320 verifies whether the behavior data 4 publicized from the practical operating system 1 is properly used in the verification data 5. The data assessing unit 320 compares the verification data 5 publicized from the verification system 2 and the behavior data 4 publicized from the practical operating system 1 to determine whether the data are properly used and outputs the determination result to the rule-deciding support unit 330.

The rule-deciding support unit 330 proposes properness of the verification data 5 along with the verification data 5 and the KPI data 9 or the proposal data to a user (a committee or a congress) of the decision-making support server 30. The rule-deciding support unit 330 inquires about whether to apply the automated driving system that is the new system or service using the innovative technology to the practical operating system 1 from the verification data 5 and the KPI data 9 or the proposal data.

When the determination result 7 indicating application of the automated driving system to the practical operating system 1 is received, the rule-deciding support unit 330 receives the improvement rule 8. The rule-deciding support unit 330 stores the received determination result 7 and the improvement rule 8 in the determination result data 6 of the storage device 13 and notifies the data publicizing unit 310.

The data assessing unit 320 applies the foregoing trust system to the determination result data 6 and then publicizes the determination result data 6 to the verification system 2 and the practical operating system 1 via the data publicizing unit 310.

<Process of Data Cooperation System>

FIG. 6 is a flowchart illustrating an example of a process executed in the data cooperation system. The process is executed when the practical operating system 1 (the first system in the drawing) publicizes the behavior data 4 and the verification system 2 (the second system in the drawing) publicizes the verification data 5 using the behavior data 4.

A timing at which the practical operating system 1 publicizes the behavior data 4 can be measured at a preset cycle. A timing at which the verification system 2 publicizes the verification data 5 can be appropriately measured according to the improvement rule 8 or advance in the innovative technology.

First, in step S11, the practical operating system 1 publicizes the behavior data 4. Subsequently, in step S12, the verification system 2 generates the learning data 45 and the environmental data 49 from the behavior data 4 and the rule data 85.

In step S13, the machine learning model is trained based on the learning data 45 and the rule data 85, and the environmental data 49 is input to the trained machine learning model for verification. In step S14, the verification system 2 publicizes the verification data 5 of the verification result and the KPI data 9 or the proposal data.

In step S15, the decision-making support system 3 (the third system in the drawing) receives the verification data 5 and determines whether to apply the innovative technology that generated the verification data 5 to the actual practical operating system 1.

In step S16, the decision-making support system 3 determines whether to apply the innovative technology to the practical operating system 1. When the innovative technology is to be applied to the practical operating system 1, the process proceeds to step S18. When the innovative technology is not to be applied to the practical operating system 1, the process proceeds to step S17. In step S17, the decision-making support system 3 generates the determination result 7 and the improvement rule 8 and publicizes the determination result 7 and the improvement rule 8 as the determination result data 6 to the verification system 2.

In the verification system 2 receiving the determination result 7 and the improvement rule 8, the learning data 45 is generated again based on the improvement rule 8 to train the machine learning model, the new verification data 5 is generated, and the foregoing processes are repeated.

Conversely, when the innovative technology is to be applied to the practical operating system 1, the decision-making support system 3 publicizes the determination result data 6 including the determination result 7 and the improvement rule 8 in step S18. Then, the practical operating system 1 acquires the determination result data 6 publicized by the decision-making support system 3 and applies changes made by the improvement rule 8 to the practical operating system 1 (S19).

In the changes by the improvement rule 8, for example, when the change by the improvement rule 8 is "a speed limit of a vehicle is alleviated to 120 Km/h in passing", the practical operating system 1 delivers software for changing the speed limit to 120 Km/h in passing regarding a vehicle of the automated driving system to the vehicle data management system 15. Accordingly, it is possible to apply the innovative technology to the practical operating system 1.

Through the foregoing processes, the verification system 2 (the second system) creates the new system or service (the fourth system) using the innovative technology with the behavior data 4 of the actually operated practical operating system 1 (the first system), and the decision-making support system 3 (the third system) assesses the verification data 5 of the verification system 2 and can quickly feed the created new system or service (the fourth system) back to the practical operating system 1 (the first system).

<Feedback of Determination Result Data>

FIGS. 18 and 19 illustrate the learning data 45 when application of a proposal for alleviating the speed limit to 120 Km/h in passing of the rule ID 803=401 in the community ID 802=C1002 of the proposal rule 80 (FIG. 17) output by the verification system 2 to the practical operating system 1 is negated by the decision-making support system 3.

The determination result 7 of the decision-making support system 3 is negation of the application to the practical operating system 1, but the decision-making support system 3 publicizes the alleviation of the speed limit to 120 Km/h in passing by the proposal rule 80 as the improvement rule 8.

FIG. 21 is a diagram illustrating an example of the improvement rule 8. In the illustrated example, the decision-making support system 3 takes the proposal rule 80 publicized by the verification system 2 in the improvement rule 8 and the verification system 2 is caused to execute the verification again.

The improvement rule 8 includes a community ID 81, a rule ID 82, a restriction 83, and a condition 84 in one record.

In the community ID 81, an identifier of a region or an organization to which the improvement rule 8 is applied is stored. In the rule ID 82, an identifier preset in the rule is stored. In the restriction 83, contents regulated by the rule is stored. In the condition 84, a condition for applying the restriction 83 is stored.

The illustrated example is an example in which the restriction 83 for alleviating the speed limit of the vehicle to 120 Km/h is added as the rule ID 82 when the condition 84 is in passing in the community ID 81=C1002.

In the verification system 2, the new learning data 45 is generated as in FIGS. 18 to 20 by the improvement rule 8 for alleviating the speed limit in passing to 120 Km/h. In the first process, as illustrated in FIGS. 13 to 15, a strikethrough is added to data in which the speed limit exceeds 100 Km/h, and the data is excluded from the learning data 45.

On the other hand, in the speed data 46 (FIG. 18), the positional data 47 (FIG. 19), and the control data 48 (FIG. 20) in the second loop to which the improvement rule 8 is applied, a period in which the speed limit exceeds 100 km/h=time 12:34:30 to time 12:34:40 are taken in the learning data 45.

The verification system 2 generates a machine learning model with the learning data 45 in which the speed limit exceeds 100 Km/h and the simulator 270 inputs the environmental data 49 to the machine learning model and executes verification (simulation). In the simulation, generally used simulation software may be used. For example, an automated driving simulator disclosed in WO2019/065409 may be used.

The verification result is stored in the verification data 5 and includes the speed data 51, the positional data 52, and the control data 53.

FIG. 22 is a diagram illustrating an example of the speed data 51 in the second loop included in the verification data 5. Items of the speed data 51 are similar to those of the speed data 41 of the behavior data 4 and include an outputter ID 511, a verification data ID 512, a time 513, a data type 514, and data 515 in one record.

In the drawing, the outputter ID 511=V2001 is a virtual verification result obtained by applying the new improvement rule 8 to the outputter ID=2001 of the learning data 45. Therefore, a virtual result is clarified as "V2001". In the speed data 51 to which the new improvement rule 8 is applied, data in which the speed limit exceeds 100 Km/h at time 513=12:34:20 to time 12:34:40 is used.

FIG. 23 is a diagram illustrating an example of the positional data 52 in the second loop included in the verification data 5. Items of the positional data 52 are similar to those of the positional data 42 of the behavior data 4. The positional data 52 includes an outputter ID 521, a verification data ID 522, a time 523, a data type 524, and data 525 in one record.

FIG. 24 is a diagram illustrating an example of control data 53 in the second loop included in the verification data 5. Items of the control data 53 are similar to those of the control data 43 of the behavior data 4. The control data 53 includes an outputter ID 531, a verification data ID 532, a time 533, a data type 534, and data 535 in one record.

FIG. 25 is a diagram illustrating an example of the KPI data 9. The verification system 2 calculates the KPI data 9 from the verification result such as the verification data 5. The KPI data 9 includes a KPI 91, a target value 92, a current situation rule 93, and a verification value 94 in one record.

In the KPI 91, an item name to be verified is stored. The illustrated example is an example in which verification is executed with CO2 emission and an accident possibility (probability). In the target value 92, a value that is a target of the verification result is stored. In the target value 92, a future target value or a latest target value can be appropriately stored.

In the current situation rule 93, a regulation value or the like by a current law is stored. In the verification value 94, a value calculated by the simulator 270 is stored.

In the illustrated example, as a result obtained by alleviating the speed limit in passing to 120 Km/h, it is verified that the verification value 94 of the CO2 emission and the accident possibility is less than the target value 92. The verification system 2 publicizes the verification data 5 and the KPI data 9 or the verified improvement rule 8.

The decision-making support system 3 receives the verification data 5, the KPI data 9, or the improvement rule 8 second time from the verification system 2 and determines whether to apply the verified improvement rule 8 to the actual practical operating system 1. When the determination result is permission of application to the practical operating system 1, the decision-making support system 3 publicizes the determination result 7 and the improvement rule 8.

FIG. 26 is a diagram illustrating an example of the determination result 7 of the decision-making support system 3. The determination result 7 includes a proposal ID 71, a community ID 72, an application possibility 73, and a condition 74 in one record.

In the proposal ID 71, a value corresponding to the proposal ID 801 of the proposal rule 80 illustrated in FIG. 17 is stored. In the community ID 72, a region or the like to which the improvement rule 8 is applied is stored. In the application possibility 73, either "applicable" or "inapplicable" is stored. In the condition 74, a restriction in the improvement rule 8 is stored.

The illustrated example is an example of the determination result 7 obtained by applying a rule for alleviating a speed limit in passing of a community ID 802=C1002 to 120 Km/h to the practical operating system 1 in the proposal rule 80 illustrated in FIG. 17. However, the alleviation of the speed limit in passing is to be implemented only in a designated section A to B as shown in the determination result 7.

The decision-making support system 3 publicizes the foregoing determination result 7 and improvement rule 8, and the fourth system that is the new service or system using the innovative technology is applied to the practical operating system 1. In the practical operating system 1, as described above, for example, software for changing the speed limit to 120 Km/h in passing in a predetermined section A to B in highway regarding a vehicle of the automated driving system is delivered to the vehicle data management system 15. Accordingly, it is possible to apply the innovative technology to the practical operating system 1.

Through the foregoing processes, the verification system 2 (the second system) applies the behavior data 4 of the practical operating system 1 currently in operation to the new system or service (the fourth system) using the innovative technology to generate the verification data 5, the decision-making support system 3 generates the determination result data 6 from the verification data 5 and feeds the determination result data 6 back to the practical operating system 1. Accordingly, it is possible to smoothly promote the verification of the innovative technology and the application to the actual practical operating system 1.

Example 2

FIG. 27 is a diagram illustrating an example of a data cooperation system according to Example 2. In the data cooperation system according to Example 2, the data assessing units 120, 220, and 320 of the practical operating server 10, the verification server 20, and the decision-making support server 30 described in Example 1 are integrated in one trust system. The other configurations are similar to those of the foregoing Example 1.

A trust system 600 is connected as a computer operating a data assessing unit 610 to the practical operating server 10, the verification server 20, and the decision-making support server 30 via the network 900. The data assessing unit 610 is loaded as a program in a memory (not illustrated) and is executed by a processor (not illustrated).

When the behavior data 4 publicized by the practical operating server 10 is received, the trust system 600 executes filtering or the like on data according to a reliability of the verification system 2 of a publicization destination. The data assessing unit 610 receives the behavior data 4 of content according to the reliability as an input, generates the learning data 45 and the environmental data 49 using the rule data 85 (or the improvement rule 8), and transmits the learning data 45 and the environmental data 49 to the verification server 20. Data such as the rule data 85 or the improvement rule 8 may be referred to by the verification server 20 or the decision-making support server 30.

Next, when the verification server 20 publicizes the verification data 5 and the KPI data 9 or the proposal rule 80, the data assessing unit 610 of the trust system 600 performs filtering or the like on the verification data 5 according to reliability of the decision-making support system 3 of the publicization destination, and then publicizes the verification data 5 to the decision-making support server 30.

The decision-making support server 30 assesses the verification data 5 and the KPI data 9 or the proposal rule 80 and publicizes the determination result data 6 including the determination result 7 and the improvement rule 8. The data assessing unit 610 of the trust system 600 performs filtering or the like on the determination result data 6 according to reliability of the practical operating system 1 or the verification system 2 of a publicization destination and then publicizes the determination result data 6 to the practical operating system 1 or the verification system 2.

When the determination result 7 of the decision-making support server 30 indicates that innovation technology is not to be applied to the practical operating system 1, the trust system 600 transmits the improvement rule 8 to the verification server 20 so that the verification is executed again.

Conversely, when the determination result 7 of the decision-making support server 30 indicates that the innovative technology is to be applied to the practical operating system 1, the trust system 600 transmits the determination result data 6 to the practical operating server 10 and applies the improvement rule 8 included in the determination result data 6 to the practical operating system 1 as in the foregoing Example 1.

As such, by adding the trust system 600 managing transmission and reception of data between the practical operating system 1, the verification system 2, and the decision-making support system 3, it is possible to promote the verification of the innovative technology and the application to the practical operating system 1 while performing the filtering or the like on the data according to the reliability of the publicization destination.

CONCLUSION

In the foregoing embodiments, the example has been described in which the automated driving system is verified using driving data of the vehicle data management system 15 as data of the actual practical operating system 1, the decision-making support system 3 determines whether to apply the automated driving system to the practical operating system 1 based on a verification result, feedback is executed to the practical operating system 1 or the verification system 2, but the present invention is not limited thereto. The present invention can be applied to various fields such as manufacturing industry (medical equipment manufacturing), financial business (cryptography), energy industry (renewable energy, power supply), transportation, and education as long as verification of a system or a service of innovative technology can be implemented in a virtual space of a model or the like using data of the practical operating system 1.

The data cooperation system according to each of the foregoing embodiments can be configured as follows.

(1) In a data cooperation system in which a first system (practical operating system 1), a second system (verification system 2), and a third system (decision-making support system 3) are connected to a network (900) to execute cooperation of information, the first system (1) includes a first computer (practical operating server 10) providing an already operating service (traffic control system 16), and collects and publicizes behavior data (4) as information for providing the service, the second system (verification system 2) acquires the behavior data (4), includes a second computer (verification server 20) executing verification of a case where the behavior data (4) is applied to a new fourth system (automated driving system 265), generates a verification result as verification data (5), and publicizes the verification data (5), the third system (decision-making support system 3) receives the behavior data (4) publicized by the first system (1) and the verification data (5) publicized by the second system, includes a third computer (decision-making support server 30) supporting decision of determination result data (6), receives the decided determination result data (6), and publicizes the determination result data (6), and the fourth system (265) is applied to the first system (1) based on the determination result data (6) publicized by the third system (3).

According to the above configuration, the second system (verification system) creates a new system or service using innovative technology with the data of the first system already operated (practical operating system 1), and the third system (decision-making support system) assesses the verification data output by the second system and can quickly feed the created new system or service (fourth system) back to the first system.

(2) The data cooperation system described in (1), in which the first system (1) includes a first data assessing unit (220) that filters or anonymizes the behavior data (4) according to reliability preset according to a publication destination to which the behavior data (4) is publicized, the second system (2) includes a second data assessing unit (220) that filters and anonymizes the verification data (5) according to reliability preset according to a publication destination to which the verification data (5) is publicized, and the third system (3) includes a third data assessing unit (320) that filters and anonymizes the determination result data (6) according to reliability preset according to a publication destination to which the determination result data (6) is publicized.

According to the above configuration, a trust system can be applied to the practical operating system 1, the verification system 2, and the decision-making support system 3. The trust system is a data distribution platform that controls access to provided data based on a use purpose of a data user that creates values satisfying data owners and levels of data protection. In the trust system, reliability of data users is calculated from policies of data owners and policies of the data users and access control is executed according to the reliability.

(3) The data cooperation system described in (1), further including: a trust system (600) connected to the network (900) and including a computer that filters or anonymizes the information according to a publicization destination of the information, in which the trust system (600) filters or anonymizes the behavior data (4) according to reliability preset according to a publicization destination of the behavior data (4) publicized by the first system (1), filters or anonymizes the verification data (5) according to reliability preset according to a publicization destination of the verification data (5) publicized by the second system (2), and filters or anonymizes the determination result data (6) according to reliability preset according to a publicization destination of the determination result data (6) publicized by the third system (3).

According to the above configuration, the trust system 600 can perform filtering or anonymization according to the reliability of a publicization destination of data and promote safe and smooth data cooperation.

(4) The data cooperation system described in (1), in which the first system (1) collects data generated in the first system (1), executes a predetermined service, and publicizes data used for the service as the behavior data (4).

According to the above configuration, the practical operating system 1 can publicize data used in a service in data generated in the practical operating system 1 as the behavior data 4.

(5) The data cooperation system described in (4), in which the second system (2) generates learning data and environmental data related to a learning target based on the behavior data (4) publicized by the first system (1) and rules of the first system (1), generates a virtual model (machine learning unit 260) from the learning data, and inputs the environmental data to the model to generate verification data (5).

According to the above configuration, the verification system 2 can generate the learning data and the environmental data related to the learning target from the behavior data 4 based on the rules of the practical operating system 1 and can generate and verify the machine learning model.

(6) The data cooperation system described in (5), in which the third system (3) generates and publicizes determination result data (6) including a determination result and an improvement rule (8) based on the verification data (5) publicized by the second system (2) and the rules of the first system, the second system (2) executes the verification again based on the improvement rule (8) when the publicized determination result (7) indicates that application of the fourth system (265) to the first system (1) is negated, and the first system (1) applies the improvement rule (8) to the first system (1) when the determination result indicates that application of the fourth system (265) to the first system (1) is permitted.

According to the above configuration, feedback to the verification system 2 and feedback of the practical operating system 1 can be performed according to the determination result 7 of the decision-making support system 3.

(7) The data cooperation system described in (5), in which the second system (2) calculates comparison data (KPI data 9) with a preset target value from the verification data (5) and adds the comparison data to the verification data (5).

According to the above configuration, in the decision-making support system 3, with reference to the KPI data 9 in addition to the verification data 5, it is possible to support decision of the determination result 7 and the improvement rule 8.

(8) The data cooperation system described in (5), in which the second system (2) receives a proposal rule (80) based on the verification data (5) and adds the proposal rule to the verification data (5).

According to the above configuration, in the decision-making support system 3, with reference to the proposal rule 80 in addition to the verification data 5, it is possible to support decision of the determination result 7 and the improvement rule 8.

The present invention is not limited to the foregoing examples, but various modifications are included. For example, the foregoing examples have been described in detail to facilitate understanding of the present invention, and not all the described constituents may be included. Some of the configurations according to a certain example can be substituted with configurations of another example, and a configuration of another example can also be added to a configuration of a certain embodiment. All additions, deletions, or substitutions of other configurations to, from, or with some configurations of each example can be applied singly or in combination.

Some or all of the foregoing configurations, functions, processing units, processing means, and the like may be implemented with hardware designed with integrated circuits. The configurations, functions, and the like may be implemented with software by causing a processor to analyze and execute programs implementing the functions. Information regarding files, tables, and program implementing each function can be stored in a memory, a recording device such as a hard disk or a solid state drive (SSD), or a recording medium such as an IC card, an SD card, or a DVD.

Control lines or information lines required for description are illustrated and not all the control lines or information lines for products are necessarily illustrated. Actually, it is considered that most of the configurations may be connected to each other.

The invention claimed is:

1. A data cooperation system in which a first system, a second system, and a third system are connected to a network to execute cooperation of information, wherein
the first system includes a first computer providing an already operating service, collects data generated in the first system, to execute a predetermined service, and collects and publicizes data used for the service as behavior data,
the second system includes a second computer acquiring the behavior data publicized by the first system and executing verification process of a case where the behavior data is applied to a new fourth system,
the verification process includes excluding data out of range of current rules of the first system from the behavior data, generating learning data and environmental data related to a learning target based on the behavior data where the data out of range of current rules of the first system is excluded, generating a virtual model from the learning data, and inputting the environmental data to the model to generate a verification result as verification data, and publicizes the verification data,
the third system includes a third computer receiving the behavior data publicized by the first system and the verification data publicized by the second system to support decision of determination result data, generates, and publicizes the determination result data including a determination result and an improvement rule based on the verification data publicized by the second system and the current rules of the first system,
the second system executes the verification process again based on the improvement rule instead of the current rules when the publicized determination result indicates that application of the fourth system to the first system is negated, and
the first system applies the improvement rule to the first system when the determination result indicates that application of the fourth system to the first system is permitted.

2. The data cooperation system according to claim 1, wherein
the first system includes a first data assessing unit that filters or anonymizes the behavior data according to reliability preset according to a publication destination to which the behavior data is publicized,
the second system includes a second data assessing unit that filters and anonymizes the verification data according to reliability preset according to a publication destination to which the verification data is publicized, and
the third system includes a third data assessing unit that filters and anonymizes the determination result data according to reliability preset according to a publication destination to which the determination result data is publicized.

3. The data cooperation system according to claim 1, further comprising:
a trust system connected to the network and including a computer that filters or anonymizes the information according to a publicization destination of the information, wherein
the trust system filters or anonymizes the behavior data according to reliability preset according to a publicization destination of the behavior data publicized by the first system, filters or anonymizes the verification data according to reliability preset according to a publicization destination of the verification data publicized by the second system, and filters or anonymizes the determination result data according to reliability preset according to a publicization destination of the determination result data publicized by the third system.

4. The data cooperation system according to claim 1, wherein the second system calculates comparison data with a preset target value from the verification data and adds the comparison data to the verification data.

5. The data cooperation system according to claim 1, wherein the second system receives a proposal rule based on the verification data and adds the proposal rule to the verification data.

6. A data cooperation method of connecting a first system, a second system, and a third system to a network to execute cooperation of information, the method comprising:
a practical operating step in which the first system provides an already operating service, and collects data generated in the first system to execute a predetermined service, and collects and publicizes data used for the service as behavior data;

a verification step in which the second system acquires the behavior data publicized by the first system, executes verification of a case where the behavior data is applied to a new fourth system, generates a verification result as verification data, and publicizes the verification data; and a decision-making support step in which the third system receives the behavior data publicized by the first system and the verification data publicized by the second system, supports decision of determination result data, and generates and publicizes the determination result data, including a determination result and an improvement rule based on the verification data and current rules of the first system, wherein in the verification step, data out of range of the current rules of the first system from the behavior data, learning data and environmental data related to a learning target are generated based on the behavior data where the data out of range of current rules of the first system is excluded, a virtual model from the learning data is generated, and the environmental data is input to the model to generate the verification data, the verification process is executed again based on the improvement rule instead of the current rules when the publicized determination result indicates that application of the fourth system to the first system is negated, and the improvement rule is applied to the first system when the determination result indicates that application of the fourth system to the first system is permitted.

7. The data cooperation method according to claim 6, wherein in the practical operating step, the behavior data is filtered or anonymized according to reliability preset according to a publication destination to which the behavior data is publicized, in the verification step, the verification data is filtered and anonymized according to reliability preset according to a publication destination to which the verification data is publicized, and in the decision-making support step, the determination result data is filtered and anonymized according to reliability preset according to a publication destination to which the determination result data is publicized.

8. The data cooperation method according to claim 6, further comprising:

a trust step in which a trust system connected to the network filters or anonymizes the information according to a publicization destination of the information, wherein in the trust step, the behavior data is filtered or anonymized according to reliability preset according to a publicization destination of the behavior data publicized by the first system, the verification data is filtered or anonymized according to reliability preset according to a publicization destination of the verification data publicized by the second system, and the determination result data is filtered or anonymized according to reliability preset according to a publicization destination of the determination result data publicized by the third system.

* * * * *